US011100925B2

(12) United States Patent
Chen

(10) Patent No.: US 11,100,925 B2
(45) Date of Patent: Aug. 24, 2021

(54) VOICE COMMAND TRIGGER WORDS

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 4 days.

(21) Appl. No.: 16/212,305

(22) Filed: Dec. 6, 2018

(65) Prior Publication Data

US 2020/0184962 A1 Jun. 11, 2020

(51) Int. Cl.
*G10L 15/22* (2006.01)
*G10L 15/08* (2006.01)
*G10L 15/30* (2013.01)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01); *G10L 2015/228* (2013.01)

(58) Field of Classification Search
CPC ......... G10L 15/22; G10L 15/30; G10L 15/08; G10L 2015/088; G10L 2015/223; G10L 2015/228
See application file for complete search history.

(56) References Cited

U.S. PATENT DOCUMENTS

| 7,149,533 | B2 | 12/2006 | Laird et al. |
| 8,095,112 | B2 | 1/2012 | Chow et al. |
| 8,296,383 | B2 | 10/2012 | Lindahl |
| 8,452,597 | B2 | 5/2013 | Bringert et al. |
| 8,548,208 | B2 | 10/2013 | Schultz |
| 8,799,000 | B2 | 8/2014 | Guzzoni et al. |
| 8,938,394 | B1 * | 1/2015 | Faaborg ................ G10L 15/22 704/275 |
| 9,027,076 | B2 | 5/2015 | Roach et al. |
| 9,338,493 | B2 | 5/2016 | Van Os et al. |
| 9,384,751 | B2 | 7/2016 | Venkatesha et al. |
| 9,489,966 | B1 | 11/2016 | Hassani et al. |
| 9,715,875 | B2 | 7/2017 | Piemot et al. |
| 9,922,646 | B1 * | 3/2018 | Blanksteen ............ G06F 3/167 |
| 2009/0181640 | A1 | 7/2009 | Jones |
| 2012/0035932 | A1 | 2/2012 | Jitkoff et al. |
| 2013/0307771 | A1 * | 11/2013 | Parker ................ G06F 3/04842 345/158 |
| 2014/0039888 | A1 | 2/2014 | Taubman et al. |
| 2014/0222436 | A1 | 8/2014 | Binder et al. |
| 2014/0324431 | A1 * | 10/2014 | Teasley ................ G10L 15/22 704/246 |

(Continued)

OTHER PUBLICATIONS

May 13, 2020—European Extended Search Report—EP 19214289.1.
Mar. 24, 2021—European Office Action—EP 19214289.1.

*Primary Examiner* — Stella L. Woo
(74) *Attorney, Agent, or Firm* — Banner & Witcoff, Ltd.

(57) ABSTRACT

Methods, systems, and apparatuses are described for context-based speech processing. A current context may be determined. A subset of trigger words or phrases may be selected, from a plurality of trigger words, as trigger words that a computing device is configured to recognize in the determined current context. The computing device may be controlled to listen for only the subset of trigger words during speech recognition.

20 Claims, 27 Drawing Sheets

(56) References Cited

U.S. PATENT DOCUMENTS

| | | | |
|---|---|---|---|
| 2015/0156307 A1* | 6/2015 | Kim | H04W 52/0251 |
| | | | 455/566 |
| 2017/0213559 A1 | 7/2017 | Kgrawal et al. | |
| 2018/0096681 A1* | 4/2018 | Ni | G10L 15/1815 |
| 2018/0182390 A1 | 6/2018 | Hughes et al. | |
| 2019/0182072 A1* | 6/2019 | Roe | G08C 17/02 |
| 2019/0342339 A1* | 11/2019 | Nanda | H04L 63/102 |
| 2020/0104094 A1* | 4/2020 | White | G10L 17/00 |

* cited by examiner

| TRIGGER WORDS | In vehicle 401 | Near (but not in) vehicle 402 | Near thermostat 403 | Near stove 404 | Watching Television 405 | Near front door of house 406 | When the doorbell rings 407 | When alarm clock rings in morning 408 | In or near the garage 409 | Near parking Meter 410 |
|---|---|---|---|---|---|---|---|---|---|---|
| "show front door camera" | | | | | ● | | ● | | | |
| "turn on the heat in the car" | | | | | ● | ● | | | | |
| "start the car" | | | | | ● | ● | | | | |
| "fast forward/rewind/play/pause" | ● | | | | ● | | | | | |
| "set temperature to x degrees" | ● | ● | ● | ● | | | | ● | | |
| "what is the temperature?" | | | ● | ● | | | | | | |
| "turn on/off" | ● | ● | ● | | | ● | | ● | ● | |
| "deactivate/activate" | ● | ● | | | | ● | | | | |
| "add x minutes" | | | | | ● | | | | | ● |
| "change to channel y" | ● | | | | ● | | | | | |
| "roll up/down" | ● | ● | | | | | | | | |
| "start/stop" | ● | ● | | ● | | | | ● | | |
| "open/close" | ● | ● | | | | | ● | | ● | |
| "record it" | | | | | ● | | | | | |
| "make me a cup of coffee" | | | | | | | | ● | | |
| "call home" | ● | | | | | | | | | |
| "tell me more" | ● | | | | ● | | | | | |
| "who's at the door?" | | | | | | | ● | | | |
| "turn up/down" | ● | | ● | ● | ● | | | ● | | |
| "lock/unlock" | ● | ● | | | | ● | ● | | | |

FIG. 4

| CONTROLLABLE DEVICES | 606 At home | 607 In vehicle | 608 At work, in meeting | 609 Movie time | 610 Dinner time |
|---|---|---|---|---|---|
| Front Door Lock | ● | | | | |
| Garage Door | ● | ● | | | |
| Computing device 501 | ● | ● | ● | | |
| Kitchen Stove 580e | ● | | | | ● |
| Lamp 580d | ● | | | ● | |
| Television 580c | ● | | | ● | |
| Speaker 580b | ● | | | ● | |
| Vehicle 580a | ● | ● | | | |

FIG. 6B

| Vehicle 580a | | | |
|---|---|---|---|
| CONTROLLABLE DEVICES/ ACTIONS | CONTEXTS | At home | In vehicle |
| Turn off the radio | | | "turn off the radio" — 614 |
| Turn on the radio | | | "turn on the radio" — 613 |
| Turn off the heat | | "turn off the heat" | "turn off the heat" |
| Turn on the heat | | "turn on the heat" | "turn on the heat" |
| Decelerate | | | "decrease the speed"; "slow down"; "decelerate" |
| Accelerate | | | "increase the speed"; "go faster"; "accelerate" |
| Turn off the vehicle | | "turn off the car" | "turn off"; "turn off the car"; "stop" |
| Turn on the vehicle | | "turn on the car" | "turn on"; "turn on the car"; "start" |

| Television 580c | | | |
|---|---|---|---|
| CONTROLLABLE DEVICES/ ACTIONS | CONTEXTS | At home | In vehicle |
| Get information | | "tell me more"; "get info" — 615 | |
| Display the guide | | "guide"; "show the guide"; "what else is on" | |
| Turn off the TV | | "turn off the TV" | |
| Turn on the TV | | "turn on the TV" | |

| Garage door | | | |
|---|---|---|---|
| Stop | | | "stop"; "stop the door" — 616 |
| Close the door | | "close the door" | "close"; "close the door" |
| Open the door | | "open the door" | "open"; "open the door" |

| Computing device 501 | | | |
|---|---|---|---|
| Schedule an event | | "schedule a meeting for" | |
| Send email | | "send an email" | |
| Initiate phone call | | "call"; "dial"; "phone" | "call"; "dial"; "phone" |

FIG. 6D

Context-based Speech Processing System: Register Users

1012 — Name: Sarah Jones

1014 — Gender: ◉ Female ◉ Male

1016 — Age: 25 ▼

1017 — Authorization Level: Medium ▼

1018 — Record voice sample [Click here]

1020 — Advanced Settings [Click here]

[Save and register another user] [Save and exit] [Cancel]

VOICE COMMAND TRIGGER WORDS

BACKGROUND

As computing costs decrease and processing power increases, more and more consumer devices are being equipped with voice control technology—allowing such devices to be controlled by voice commands instead of, or in addition to, traditional means of control, such as by pressing a button. Today, devices such as televisions, virtual assistants, navigation devices, smart phones, remote controls, wearable devices, and more are capable of control using voice commands. However, performing speech recognition requires electrical power, computer processing, and time, and there may be situations in which these resources may be limited (e.g., in battery-operated devices or in situations in which computer processing should be reduced to minimize time delay or to reserve processing resources for other functions, etc.).

SUMMARY

The following presents a simplified summary in order to provide a basic understanding of certain features. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems, apparatuses, and methods are described herein for providing an energy-efficient speech processing system, such as an always-on virtual assistant listening device controlled by trigger words. An energy savings may be achieved by adjusting the universe of trigger words recognized by the system. The speech processing system may dynamically adjust the universe of trigger words that it will recognize, so that in some contexts, the system may recognize more words, and in other contexts the system may recognize fewer words. The adjustment may be based on a variety of contextual factors, such as battery power level, computer processing availability, user location, device location, usage of other devices in the vicinity, etc.

The speech processing system may be configured to determine a current context related to the listening device. Various input devices may be determined and the input devices may be used to determine the current context. Based on the determined current context, a subset of trigger words may be determined from a universe of trigger words that the listening device is able to recognize. The subset of trigger words may represent a limited set of trigger words that the listening device should listen for in the current context—e.g., trigger words that are practical in the given context. By not requiring the listening device to listen for words that are not practical and/or do not make sense in the current context, the system may reduce processing power and energy used to perform speech processing functions. The system may further control various connected devices using the trigger words according to the current context. A determination may be made as to whether an energy savings results from operating the system according to a current configuration.

The features described in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

FIG. 4 shows a chart of example contexts and corresponding trigger words.

FIG. 6B shows a chart of example contexts and corresponding devices controlled in each of the contexts in a context-based speech processing system.

FIG. 6D shows a chart of example contexts, corresponding devices and actions controlled in each of the contexts, and corresponding trigger words for controlling the devices and actions in the context in a context-based speech processing system.

FIGS. 10A-10J show example user interfaces associated with a context-based speech processing system.

DETAILED DESCRIPTION

Figure 1:
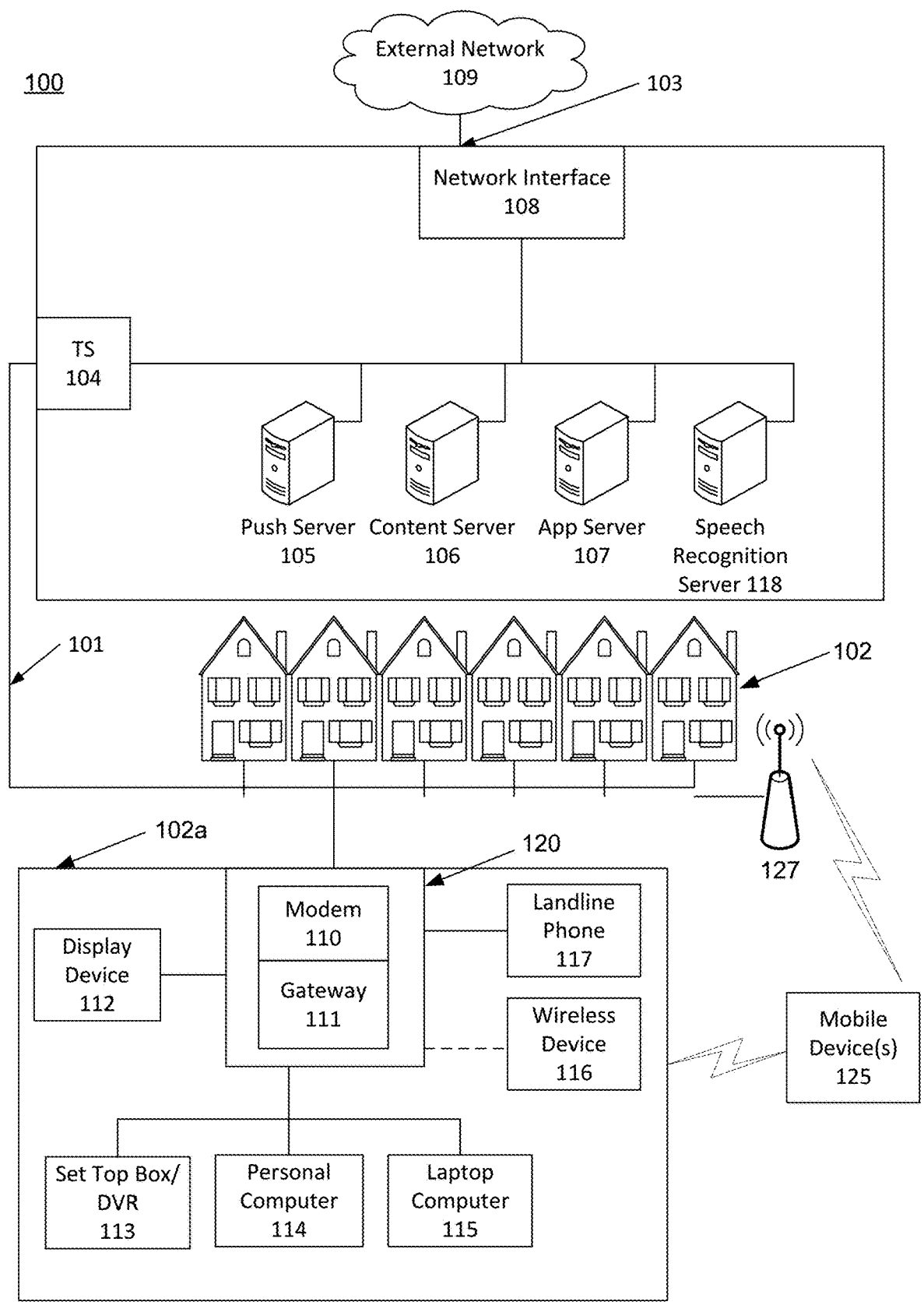
FIG. 1 shows an example of communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, train stations, airports, etc.) to a local office 103 (e.g., a headend). The local office 103 may transmit downstream information signals onto the communication links 101, and each of the premises 102 may have a receiver used to receive and process those signals.

One of the communication links 101 may originate from the local office 103, and may be split a number of times to distribute the signal to the various premises 102 in the vicinity (which may be many miles) of the local office 103. The communication links 101 may include components not shown, such as splitters, filters, amplifiers, etc. to help convey the signal clearly. Portions of the communication links 101 may also be implemented with fiber-optic cable, while other portions may be implemented with coaxial cable, other lines, or wireless communication paths. The communication links 101 may be coupled to a base station 127 configured to provide wireless communication channels to communicate with a mobile device 125. The wireless communication channels may be Wi-Fi IEEE 802.11 channels, cellular channels (e.g., LTE), and/or satellite channels.

The local office 103 may include an interface 104, such as a termination system (TS). More specifically, the interface 104 may be a cable modem termination system (CMTS), which may be a computing device configured to manage communications between devices on the network of the communication links 101 and backend devices, such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding mobile devices 125 (e.g., cell phones, smartphone, tablets with cellular radios, laptops communicatively coupled to cellular radios, etc.).

As noted above, the local office 103 may include the servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s).

The local office 103 may also include one or more application server 107. The application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, the application server 107 may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, the content server 106, and the application server 107 may be combined. Further, here the push notification server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more of the communication links 101 with other devices in the network. For example, the interface 120 may include a modem 110, which may include transmitters and receivers used to communicate on the communication links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol (VoIP) phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at premise 102a may be configured to provide wireless communications channels (e.g., IEEE 802.11 channels) to communicate with the mobile devices 125. As an example, the modem 110 (e.g., access point) or wireless device 116 (e.g., router, tablet, laptop, etc.) may wirelessly communicate with the mobile devices 125, which may be off-premises. As an example, the premise 102a may be train station, airport, port, bus station, stadium, home, business, or any other place of private or public meeting or congregation by multiple individuals. The mobile devices 125 may be located on the individual's person.

The mobile devices 125 may communicate with the local office 103. The mobile devices 125 may be cell phones, smartphones, tablets (e.g., with cellular transceivers), laptops (e.g., communicatively coupled to cellular transceivers), or any other mobile computing device. The mobile devices 125 may store assets and utilize assets. An asset may be a movie (e.g., a video on demand movie), television show or program, game, image, software (e.g., processor-executable instructions), music/songs, webpage, news story, text listing, article, book, magazine, sports event (e.g., a football game), images, files, or other content. As an example, the mobile device 125 may be a tablet that may store and playback a movie. The mobile devices 125 may include Wi-Fi transceivers, cellular transceivers, satellite transceivers, and/or global positioning system (GPS) components.

As noted above, the local office 103 may include a speech recognition server 119. The speech recognition server 119 may be configured to process speech received from a computing device, for example, received from the mobile device 125 or the set-top box/DVR 113. For example, the mobile device 125 or the set-top box/DVR 113 may be equipped with a microphone, or may be operatively connected to an input device, such as a remote control that is equipped with a microphone. The microphone may capture speech and the speech may be transmitted to the mobile device 125 or the set-top box/DVR 113 for processing or may, alternatively, be transmitted to the speech recognition server 119 for processing.

Figure 2:
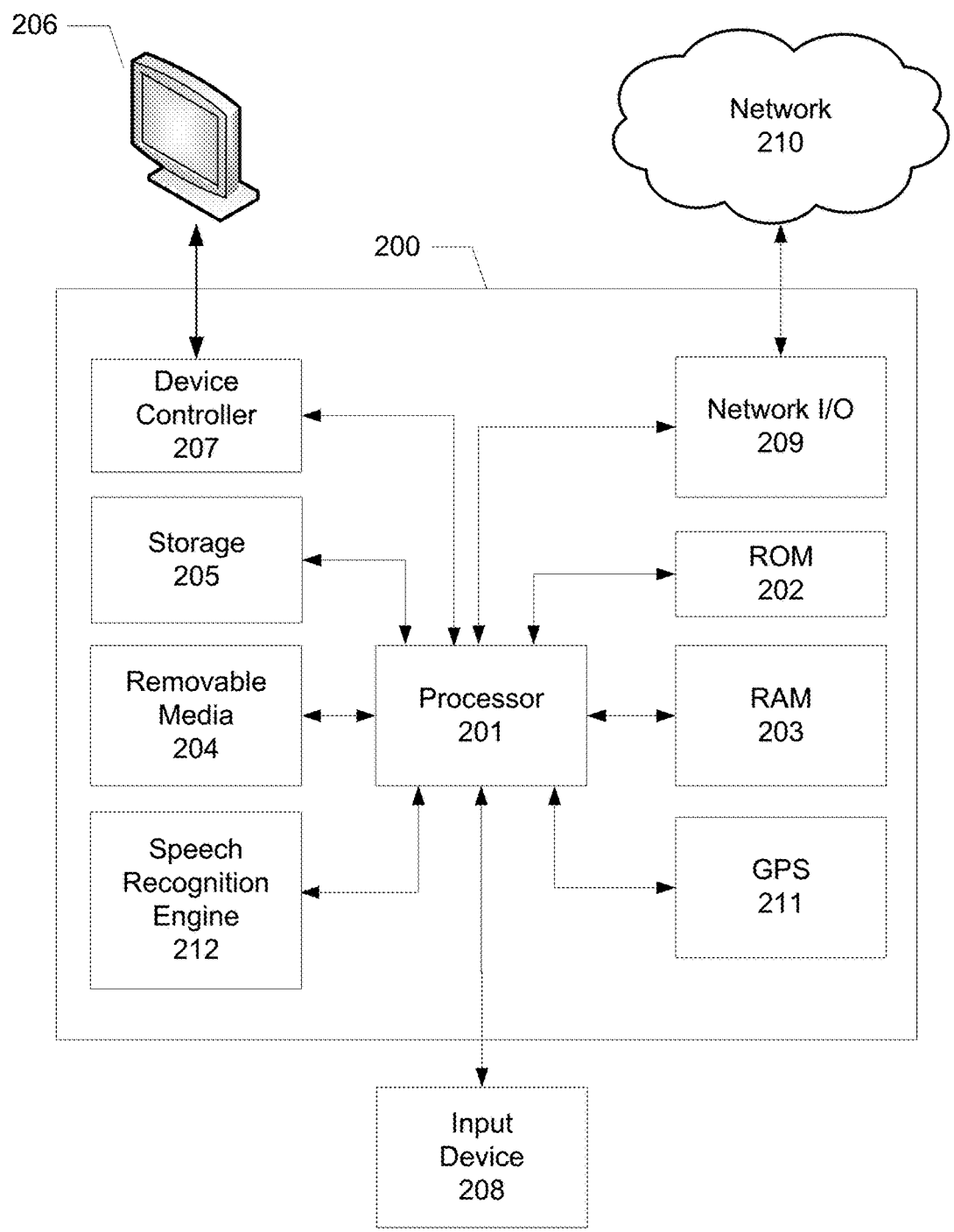
FIG. 2 shows hardware elements of a computing device.

FIG. 2 shows general hardware elements that can be used to implement any of the various computing devices discussed herein. The computing device 200 (e.g., the set-top box/DVR 113, the mobile device 125, etc.) may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a microphone, remote control, keyboard, mouse, touch screen, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some embodiments, the network I/O circuit 209 may include a modem (e.g., a cable modem), and the external network 210 may include the communication links 101 discussed above, the external networks 109, an in-home network, a provider's wireless, coaxial, fiber, or hybrid fiber/coaxial distribution system (e.g., a DOCSIS network), or any other desired network. The computing device 200 may include a location-detecting device, such as a global positioning system (GPS) microprocessor 211, which can be configured to receive and process global positioning signals and determine, with possible assistance from an external server and antenna, a geographic position of the computing device 200. The computing device 200 may additionally include a speech recognition engine 212 which processes and interprets speech input received from the input device 208, such as a microphone.

While the example shown in FIG. 2 is a hardware configuration, the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM 202, the display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

Features described herein may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. The functionality may be embodied in whole or in part in firmware or hardware equivalents such as integrated circuits, field programmable gate arrays (FPGA), and the like. Particular data structures may be used to more effectively to implement features described herein, and such data structures are contemplated within the scope of computer executable instructions and computer-usable data described herein.

Figure 3A:
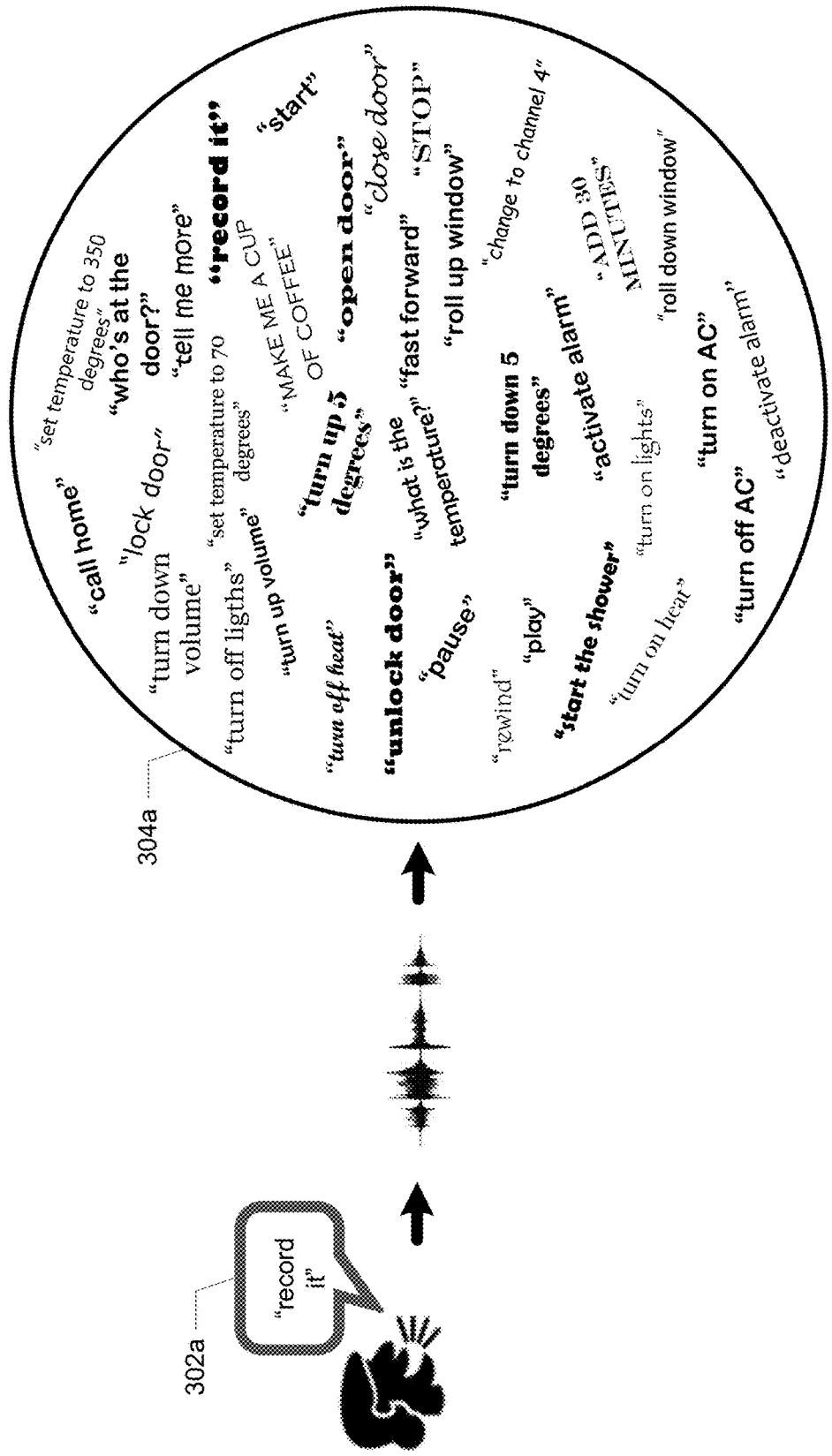
FIGS. 3A-3C show example methods of speech processing.
Figure 3B:
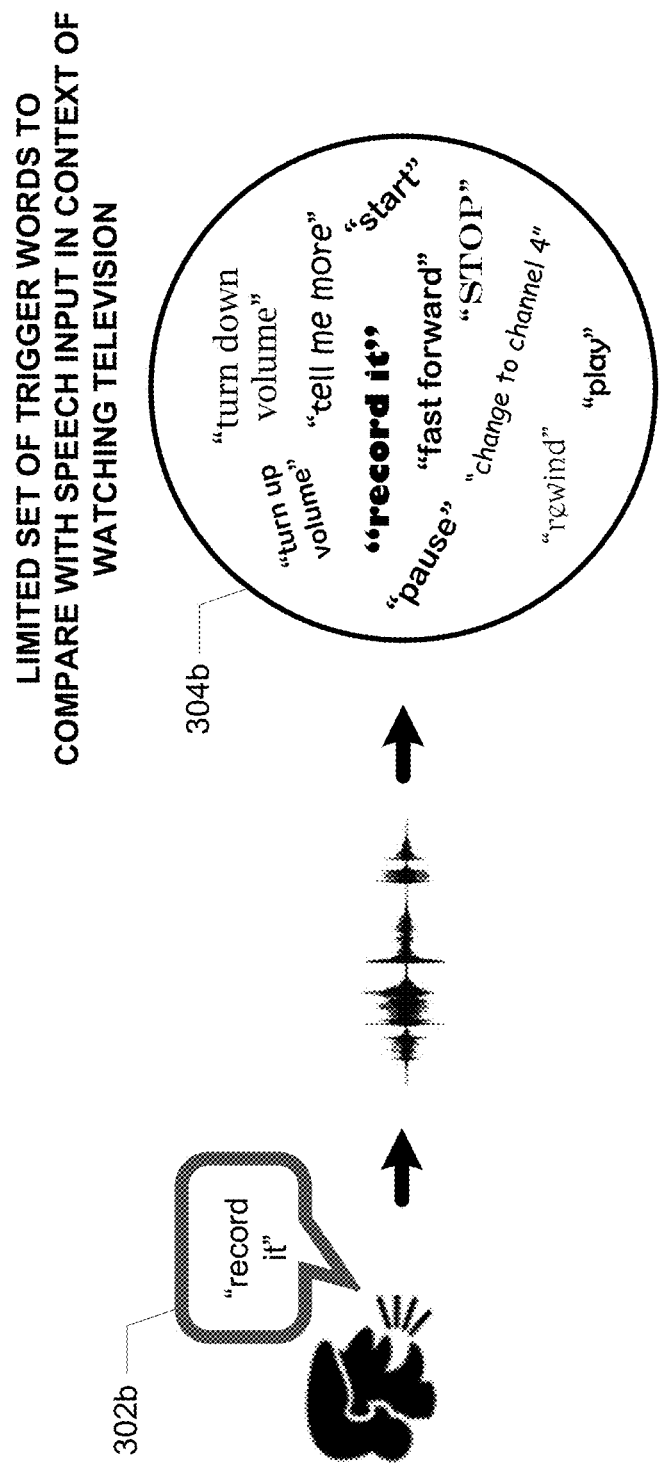
Figure 3C:
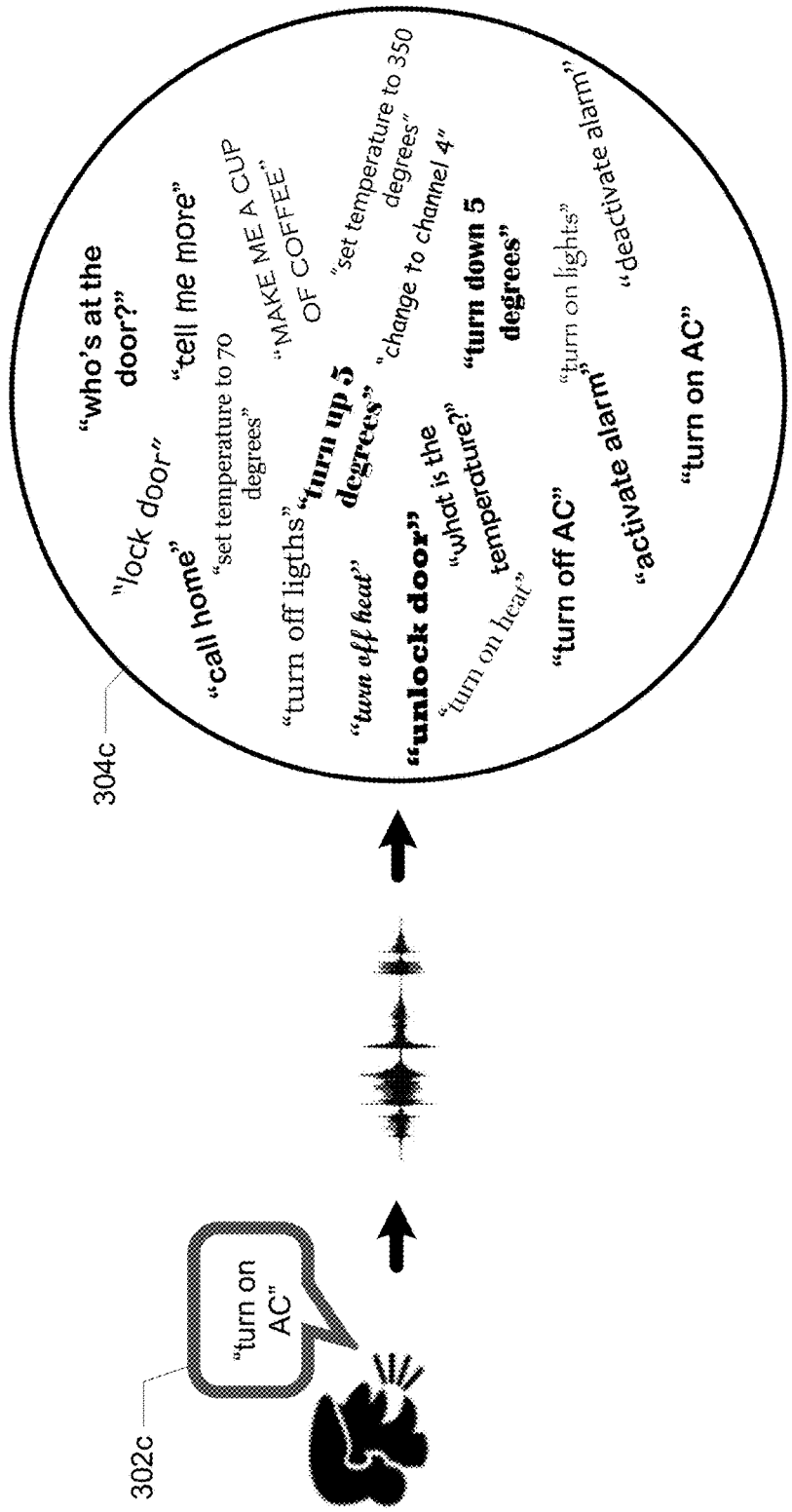

FIGS. 3A-3C show examples of methods of speech processing. A speech processing system, e.g., a listening device, may be capable of performing a variety of different functions based on a voice input. The listening device may be a smartphone having a virtual assistant feature. The listening device may receive voice commands which instruct the listening device to perform a variety of tasks for a user, such as adding an appointment to a calendar, providing the weather, initiating a phone call, etc., or controlling a variety of different connected devices, such as a television, a smart stove, a coffee maker, or even a vehicle. For example, referring to FIG. 3A, in response to a person speaking a voice command 302a, such as "record it," to a listening device that controls a variety of different connected devices, such as a television, a car, a door, a light, a thermostat, a stove, etc., there may be a large universe of commands or trigger words, e.g., trigger words 304a, with which the voice command 302a must be compared during speech processing since each of the connected devices may require different trigger words to control the device. The listening device may store or remotely access the universe of trigger words and then compare the voice command 302a to each of the trigger words to determine what the user intends. Depending on the size of the universe of trigger words, such a comparison can be costly—using large amounts of computing resources, negatively impacting processing times, and thus degrading performance, or alternatively, sacrificing accuracy to improve performance. Moreover, such heavy processing has a negative impact on energy usage, which is particularly relevant for low-powered devices, such as wearable and portable devices that do not have a continuous power supply and, instead, must rely on a limited supply of power, generally provided from a battery. In these devices, reducing energy costs is particularly important. Therefore, it would be advantageous for the listening device to limit the universe of trigger words which are supported for speech processing depending on the situation or the context in which the device is operating.

A context-based speech processing system may limit the set of trigger words that a listening device must listen for based on the context in which the device is currently operating. The listening device may be a smartphone having a virtual assistant feature configured with the context-based speech processing system. The listening device may receive voice commands which instruct the listening device to perform a variety of tasks for a user or control a variety of different connected devices. In this case, the context-based speech processing system may, prior to processing speech, determine a context in which the listening device is operating.

Referring to FIG. 3B, the context-based speech processing system may determine that a user of the listening device is watching television. For example, a television connected to the context-based speech processing system may send information to the system indicating that the television is turned on. The listening device may further send information to the system indicating that it is in proximity of the television. For example, the listening device may comprise an indoor positioning system which may determine the location of the listening device in the home and its distance from the television. The listening device, may further send information to the system indicating that the device is in the presence of the user. For example, a grip sensor on the device may detect that the device is being held or a camera on the device may detect the user in its proximity. Alternatively or additionally, a camera connected to the context-based speech processing system and located in the vicinity of the television may record video of an area around the television and after detecting the presence of an individual facing the television, may send information to the system indicating such. The system may further use facial recognition (or other forms of recognition) to determine the identity of the individual for authenticating the individual for using the system. Based on the information sent to the system, the system may determine the context as "watching television." In this case, the system may limit the trigger words which are to be compared with speech to only those trigger words which are applicable in the context of "watching television." For example, as shown in FIG. 3B, in response to a person speaking a voice command 302b, such as "record it," to the listening device in the context of "watching television," there may be a smaller universe of trigger words 304b with which the voice command 302b must be compared during speech processing as compared to the full universe of the trigger words 304a, shown in FIG. 3A. For example, in the context of "watching television," certain commands, such as "roll down the window," which may be a command for rolling down a car window, may not make sense in the current context and, thus, such words may be omitted from the universe of recognizable words when in that context.

Referring to FIG. 3C, the system may determine that the battery power of the listening device is low. For example, if the battery power of the listening device is below a predetermined threshold value, such as 30%, the listening device may determine low battery power and send information to the context-based speech processing system indicating such. Based on such information, the system may determine the context as "low battery power." In this case, the system may limit the trigger words which are to be compared with speech to a smaller set of trigger words than the universe of trigger words, in order to preserve battery power during speech processing. For example, as shown in FIG. 3C, in response to a person speaking a voice command 302c, such as "turn on the AC," to the listening device in the context of "low battery power," there may be a smaller universe of trigger words 304c with which the voice command 302c must be compared during speech processing as compared to the full universe of the trigger words 304a, shown in FIG. 3A.

FIG. 4 shows a chart of example contexts and corresponding trigger words. As shown in FIG. 4, the context-based speech processing system may determine any number of different contexts related to the listening device, such as being located in a vehicle, being located near a vehicle, being located near a home thermostat, being located near a stove, watching television, etc. In each of those contexts, there may exist a certain set of functionality that is applicable in that context, and a certain subset of trigger words that are more likely to be needed (and other words that may serve no function). For instance, if a user of a device is located in his vehicle, the user may wish to issue commands related to the vehicle—such as locking and unlocking the vehicle, adjusting the volume of the vehicle radio up or down, opening or closing a nearby garage door, etc. However, it may not be appropriate while the user is in the vehicle for the user to issue commands to make a cup of coffee or to ask who is at the door, for example. These commands may be applicable in different contexts, such as when the alarm clock rings in the morning or when the user is home and the doorbell rings. In this case, it is advantageous to be able to restrict the trigger words that are applicable in certain contexts to a limited set of trigger words and configure the listening device to only listen for those trigger words in the appropriate context. Doing so allows the system to process speech using a substantially reduced set of trigger words. Comparing fewer trigger words during speech processing reduces computing resource usage, results in energy savings, and improves processing times, performance, accuracy, and ultimately a user experience.

Figure 5:
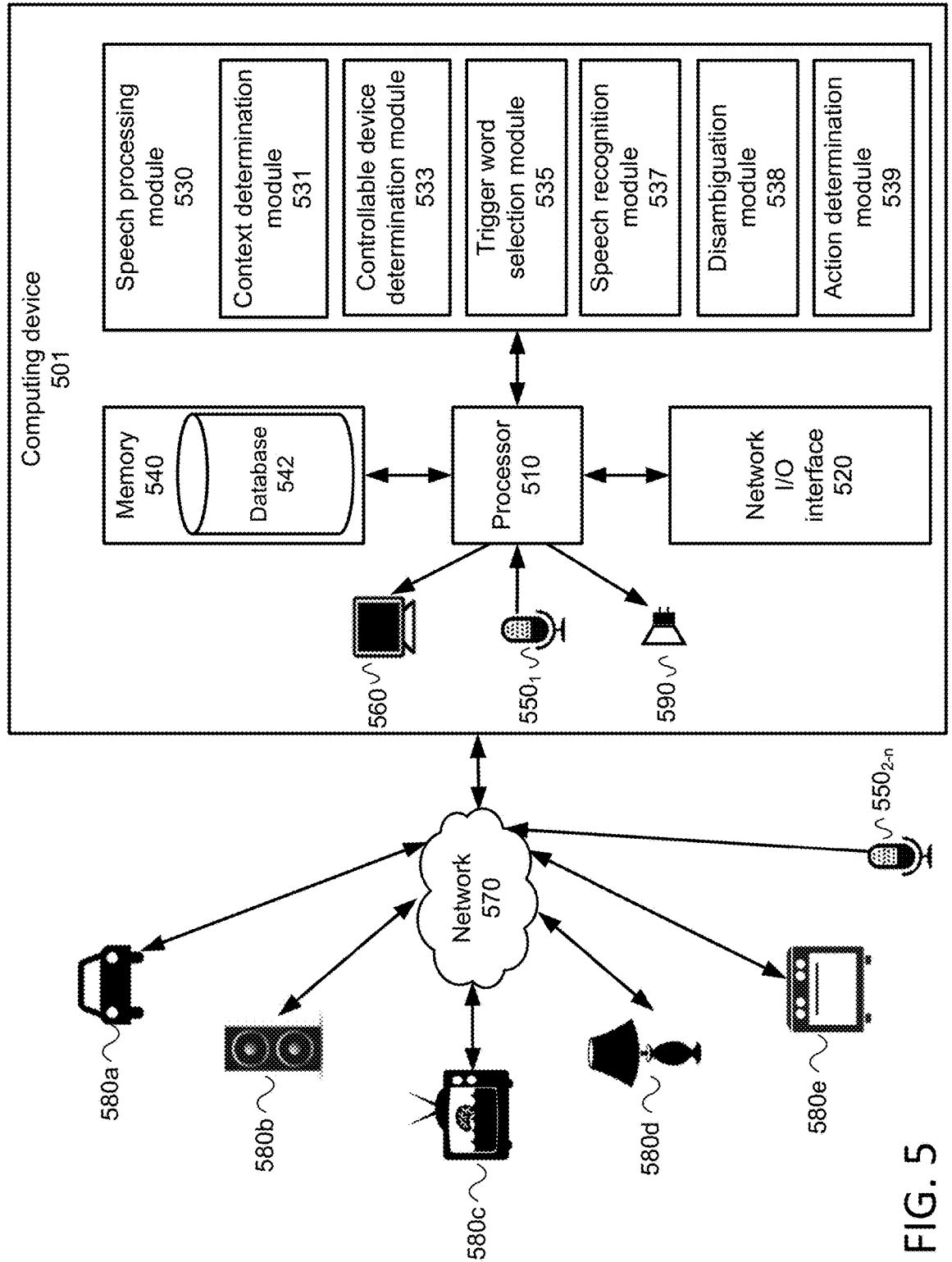
FIG. 5 shows an example configuration of a computing device that may be used in a context-based speech processing system.

FIG. 5 shows an example configuration of a computing device used in a context-based speech processing system. As shown, a context-based speech processing system 500 comprises a computing device 501, a network 570, and controllable devices 580.

The computing device 501 may be a gateway, such as the gateway interface device 111, a STB or DVR, such as STB/DVR 113, a personal computer, such as a personal computer 114, a laptop computer, such as a laptop computer 115, or a wireless device, such as wireless device 116, shown in FIG. 1. The computing device 501, may be similar to the computing device 200, shown in FIG. 2. The computing device 501 may further be a smartphone, a camera, an e-reader, a remote control, a wearable device (e.g., an electronic glasses, an electronic bracelet, an electronic necklace, a smart watch, a head-mounted device, a fitness band, an electronic tattoo, etc.), a robot, an Internet of Things (IoT) device, etc. The computing device 501 may be the listening device described with respect to FIGS. 3A-3C and 4. The computing device 501 may be one of the above-mentioned devices or a combination thereof. However, the computing device 501 is not limited to the above-mentioned devices and may include other existing or yet to be developed devices.

As shown, the computing device 501 may comprise a processor 510, a network I/O interface 520, a speech processing module 530, a memory 540, a microphone 550$_1$, a display device 560, and a speaker 590. Some, or all, of these elements of the computing device 501 may be implemented as physically separate devices.

The processor 510 may control the overall operation of the computing device 501. For example, the processor 510 may control the network I/O interface 520, the speech processing module 530, the memory 540, the microphone 550$_1$, the display device 560, and the speaker 590 connected thereto to perform the various features described herein.

The network I/O interface 520, e.g., a network card or adapter, may be similar to the network I/O circuit 209 and may be used to establish communication between the computing device 501 and external devices, such as controllable devices 580. For example, the network I/O interface 520 may establish a connection to the controllable devices 580 via the network 570. The network I/O interface 520 may be a wired interface, wireless interface, or a combination of the two. In some embodiments, the network I/O interface 520 may comprise a modem (e.g., a cable modem).

The memory 540 may be ROM, such as the ROM 202, RAM, such as the RAM 203, movable media, such as the removable media 204, a hard drive, such as the hard drive 205, or may be any other suitable storage medium. The memory 540 may store software and/or data relevant to at least one component of the computing device 501. The software may provide computer-readable instructions to the processor 510 for configuring the computing device 501 to perform the various features described herein. The memory 540 may additionally comprise an operating system, application programs, databases, such as database 542, etc. The database 542 may be a database for storing the various listings and mappings, such as the data shown and described below with respect to Tables 1-3 and FIGS. 6A-6D. The database 542 may further store additional data related to the context-based speech processing system 500.

The microphone 550$_1$ may be configured to capture audio, such as speech. The microphone 550$_1$ may be embedded in the computing device 501. The context-based speech processing system 500 may comprise one or more additional microphones, such as microphones 550$_{2-n}$, which may be one or more separate devices external to the computing device 501. In this case, the context-based speech processing system 500 may transmit audio captured by the microphones 550$_{2-n}$ to the computing device 501. One of the microphones 550$_{1-n}$ may serve as a primary microphone, while the other microphones 550$_{1-n}$ may serve as secondary microphones. For example, microphone 550$_1$ may serve as a primary microphone and microphones 550$_{2-n}$ may serve as secondary microphones. The primary microphone 550$_1$ may default to an activated (i.e., ON) state, such that by default the microphone 550$_1$ is enabled (i.e., turned on) to capture audio. The secondary microphones 550$_{2-n}$ may default to a deactivated (i.e., OFF) state, such that by default the microphones 550$_{2-n}$ are disabled (i.e., turned off) from capturing audio or audio captured from such microphones is ignored. The microphones 550$_{1-n}$ may be manually or automatically switched between enabled and disabled states. For example, a user of the context-based speech processing system may manually enable or disable one or more of the microphones 550$_{1-n}$ by engaging a switch thereon or via a remote interface for controlling the microphones 550$_{1-n}$. Additionally, the context-based speech processing system 500 may automatically enable or disable one or more of the microphones 550$_{1-n}$. For example, one or more of the microphones 550$_{1-n}$ may be automatically enabled in response to the occurrence of certain situations, such when an already enabled microphone 550$_{1-n}$ is unable to properly capture speech, e.g., because it is too far away from the speaker, it is a low fidelity microphone, etc. In such a case, the context-based speech processing system 500 may automatically enable one or more of the microphones 550$_{1-n}$ that may be more capable of capturing the speech, e.g., a microphone closer to the speaker, a higher fidelity microphone, etc. In some cases, the context-based speech processing system 500 may additionally disable certain microphones 550$_{1-n}$ in such situations, e.g., the microphones which are unable to capture the speech properly. The system may automatically enable or disable one or more of the microphones 550$_{1-n}$ for other reasons, such as based on a current context determined by the system. Alternatively, or additionally, the system may automatically adjust one or more settings associated with one or more of the microphone 550$_{1-n}$, such as the frequency, sensitivity, polar pattern, fidelity, sample rate, etc.

The display device 560 may display various types of output. For example the display device 560 may output trigger words that are available in the current context. The display device 560 may be housed in the computing device 501 or may be a device external to the computing device 501.

The speaker 590 may output various types of audio. For example, the speaker 590 may output trigger words that are available in the current context, challenge questions to the user, notifications, responses to the user's queries, etc. The speaker 590 may be housed in the computing device 501 or may be a device external to the computing device 501.

The network 570 may comprise a local area network (LAN), a wide-area network (WAN), a personal area network (PAN), wireless personal area network (WPAN), a public network, a private network, etc. The network I/O interface 520 may comprise the external network 210 described with respect to FIG. 2.

The controllable devices 580 may comprise any device capable of being controlled by the computing device 501. For example, the controllable devices 580 may comprise devices, such as a vehicle 580$a$, a speaker device 580$b$, a television 580$c$, a lamp 580$d$, a kitchen stove 580$e$, and the microphones 550$_{1-n}$. The controllable devices 580 are not limited to the above-mentioned devices and may comprise other devices which may be capable of control by the computing device 501. For example, the controllable devices 580 may further comprise a radio, a smart watch, a fitness device, a thermostat, a smart shower or faucet, a door lock, a coffee maker, a toaster, a garage door, a parking meter, a vending machine, a camera, etc. The computing device 501 may be used to control various operating functions of the controllable devices 580. For example, the computing device 501 may be used to control the controllable devices 580 to perform one or more actions by controlling an on/off state or a setting of the controllable devices 580. For example, the computing device 501 may be used to unlock a door on the vehicle 580$a$, adjust the bass on a speaker device 580$b$, turn on the television 580$c$, dim the light of the lamp 580$d$, adjust a temperature of the kitchen stove 580$e$, turn on or turn off one or more of the microphones 550$_{1-n}$, etc. The action may take many different forms and need not be solely related to controlling one of the controllable devices 580, but may also be related to controlling the computing device 501 itself, such as adjusting a setting on the computing device 501 or performing a function on the computing device 501, such as initiating a phone call. A user of the context-based speech processing system 500 may configure the system with a list of devices that may be controlled by the system, e.g., the controllable devices 580. Alternatively or additionally, the system may be preconfigured with a list of devices that may be controlled. The list of controllable devices 580, such as shown below in Table 1, may be stored in the database 542 of the memory 540.

TABLE 1

Controllable Devices

Vehicle 580a
Speaker device 580b
Television 580c
Lamp 580d
Kitchen stove 580e
Computing device 501
Microphones $550_{1-n}$
Garage door
Parking meter
Door lock The user may configure the system to determine, for each controllable device 580, one or more actions that the system may control the controllable device 580 or the computing device 501 to perform. Alternatively or additionally, the system may be preconfigured with the actions that the system may control the controllable device 580 or the computing device 501 to perform. A mapping, such as shown in Table 2, of controllable devices 580 and the corresponding actions that may be controlled may be stored in the database 542 of the memory 540.

TABLE 2

| Controllable Devices | Actions |
| --- | --- |
| Vehicle 580a | Turn on the vehicle |
| | Turn off the vehicle |
| | Accelerate |
| | Decelerate |
| | Turn on the heat |
| | Turn off the heat |
| | Turn on the radio |
| | Turn off the radio |
| Speaker device 580b | Turn on the speaker device |
| | Turn off the speaker device |
| | Adjust the volume up |
| | Adjust the volume down |
| Television 580c | Turn on the television |
| | Turn off the television |
| | Display the guide |
| | Get information |
| Lamp 580d | Turn on the lamp |
| | Turn off the lamp |
| | Adjust the brightness up |
| | Adjust the brightness down |
| Kitchen stove 580e | Turn off the kitchen stove |
| | Turn off the kitchen stove |
| | Set the temperature |
| Microphones $550_{1-n}$ | Turn on the microphone |
| | Turn off the microphone |
| Computing device 501 | Initiate a phone call |
| | Send an email |
| | Schedule an event |
| Garage door | Open the garage door |
| | Close the garage door |
| | Stop opening or closing the garage door |
| Parking meter | Add time to the meter |
| Door lock | Lock the door |
| | Unlock the door |

The computing device 501 may be capable of controlling different controllable devices 580 and performing different corresponding actions in different contexts. Further, the computing device 501 may be capable of controlling the controllable devices 580 using voice commands detected by the microphones $550_{1-n}$ connected to the computing device 501.

The speech processing module 530 may be a module for controlling the controllable devices 580 using voice commands. The speech processing module 530 may comprise a context determination module 531, a controllable device determination module 533, a trigger word selection module 535, a speech recognition module 537, a disambiguation module 538, and an action determination module 539.

The speech processing module 530 may listen for and capture speech received through the microphones $550_{1-n}$, interpret the speech, determine a current context, and based on the determined current context, determine whether the speech is a command intended to trigger the computing device 501 to perform an action, such as controlling one or more of the controllable devices 580. The speech processing module 530 may determine whether the speech is a command intended to trigger the computing device 501 to perform an action by comparing the speech to a corpus of trigger words. The speech processing module 530 may limit, to a subset of the corpus of trigger words, the trigger words to consider in the comparison. The speech processing module 530 may determine the trigger words to be included in the subset based on a current context. If the speech matches one of the trigger words in the subset, the computing device 501 may control to perform an action corresponding to the trigger word. In this way, the speech processing module 530 may reduce the number of trigger words that must be compared to the speech, thus reducing processing time and processing costs, and improving performance and speech processing accuracy.

The context determination module 531 may determine a current context related to the computing device 501. The current context may be determined based on one or more environmental parameters. The environmental parameters may be a set of measurable properties whose values may be used to determine the current context. A user of the system may configure one or more environmental parameters and their measured values which may be used to determine the current context. Each context, and the environmental parameters and corresponding values used to determine that context, may be stored in the database 542 of the memory 540.

The various environmental parameters may comprise, for example, the location of the computing device 501, the time of day and/or day of week, an activity being performed by the person speaking (e.g., watching television, taking a shower, reading an email, etc.), weather conditions, the presence of other people in the vicinity of the computing device 501, the presence of other devices in the vicinity of the computing device 501, the proximity of the person speaking to the computing device 501 or one of the controllable devices 580, lighting conditions, background noise, the arrival time of an event scheduled on a calendar, etc.

The environmental parameters may additionally comprise an operating state, characteristic, or setting of the computing device 501 or one of the controllable devices 580, an application being run by the computing device 501 or one of the controllable devices 580, content playing on the computing device 501 or one of the controllable devices 580 (e.g., a program playing on the television 580c), a biometric reading of the speaker, a movement of the computing device 501, a cellular signal strength of the computing device 501, a power level of the computing device 501 or one of the controllable devices 580 (e.g., whether the device is plugged into power source, the battery level, etc.), a network connection status, etc. The environmental parameters are not limited to the above-mentioned environmental parameters and may comprise different or additional environmental parameters.

The environmental parameters may be determined using data obtained from one or more contextual input devices. The contextual input device may be a sensor device or a device having a sensor embedded therein. The sensors of the contextual input devices may be used to gather information from the environment surrounding the computing device 501. For example, data may be obtained from various contextual input devices, such as a mobile device, a fitness bracelet, a thermostat, a window sensor, an image sensor, a proximity sensor, a motion sensor, a biometric sensor, a vehicle seat sensor, a door sensor, an ambient light sensor, a GPS receiver, a temperature sensor, an accelerometer, a gyroscope, a magnetometer, a barometer, a grip sensor, etc. For example, an image sensor of a camera may detect certain movement and may be used to determine the presence of people in a room, or may detect a speaker making a gesture, such as pointing at the television 580c, and may be used to determine that the speaker is watching television; an accelerometer of the computing device 501 may detect acceleration of the computing device 501 and may be used to determine that the speaker is in a moving vehicle; a vehicle seat sensor embedded in a seat of the vehicle 580a may detect the weight of a person and may be used to determine that the speaker is in the vehicle 580a; a biometric sensor of a fitness bracelet may be used to detect a biometric reading and may be used to determine that a user is in distress; a motion detector near an entrance door may detect movement and may be used to determine that a person is at the door; etc.

The sensors may be embedded in the computing device 501 and/or in the controllable devices 580. In this case, the computing device 501 and/or the controllable devices 580 may also serve as contextual input devices. The sensors may further be embedded in other peripheral devices or may be stand-alone sensors. The contextual input devices and corresponding sensors used to gather information from the environment are not limited to the above-mentioned devices and sensors and may include other devices or sensors that may be capable of gathering environmental information.

The environmental parameters need not be determined solely using sensors and may additionally be determined using various forms of data. For example, data indicating an operational state of the computing device 501 or one of the controllable devices 580 may be used to determine environmental parameters such as an on/off state of one or more of the controllable devices 580, the battery level of the computing device 501, etc. The environmental parameters may also be determined using other data acquired from the computing device 501 or one of the controllable devices 580, such as time of day, cellular signal strength of the computing device 501, the arrival time of an event scheduled on a calendar, content playing on the computing device 501 or one of the controllable devices 580, etc. The environmental parameters may additionally be determined using network data, such as to determine when the computing device 501 is connected to a network, such as a home network or a workplace network to indicate the location of the computing device 501. The environmental parameters determined from the computing device 501, the controllable devices 580, and the various peripheral devices may be used alone or in combination to determine the current context.

The determination of the environmental parameters is not limited to the methods described above. A number of different methods of determining the environmental parameters may be used.

Figure 6A:
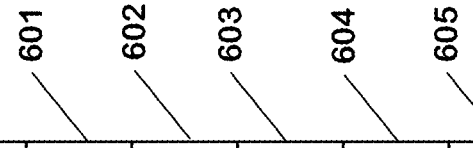
FIG. 6A shows a chart of example contexts and corresponding environmental parameters used to determine the contexts in a context-based speech processing system.

FIG. 6A shows a chart of example contexts and corresponding environmental parameters used to determine the contexts in the context-based speech processing system 500. Referring to FIG. 6A, an environmental parameter, such as a device location parameter, determined using sensor data, acquired from a GPS receiver in the computing device 501, indicating that the computing device 501 is located in the user's home, may be used alone by the context determination module 531 to determine the current context as the speaker being located at home, as shown in row 601. While environmental parameters, such as a vehicle seat status parameter, determined using sensor data, acquired from a vehicle seat sensor in the vehicle 580a, indicating a seat in the vehicle 580a is occupied, and a speed parameter, determined using sensor data, acquired from an accelerometer in the computing device 501, indicating that the computing device 501 is moving at a speed greater than a predetermined speed, such as 30 mph, for a predetermined amount of time, may be used in combination by the context determination module 531 to determine the current context as the speaker being located in the vehicle 580a, as in row 602. Likewise, environmental parameters, such as a current date/time parameter, determined using data acquired from the computing device 501, indicating the current date and the time of day, an event date/time parameter, determined using data acquired from the computing device 501, indicating the date and time of an event scheduled on a calendar, and the device location parameter, determined using the sensor data from a GPS receiver of the computing device 501, indicating that the computing device 501 is located at the user's place of work, may be used by the context determination module 531 to determine the current context as the speaker being located at work in a meeting, as in row 603.

Further, the context determination module 531 may use the environmental parameters to determine a single context or multiple contexts. For example, environmental parameters, such as the date/time parameter, determined using data acquired from the computing device 501, indicating the date as Dec. 15, 2018, and the time of day as 6:00 pm, a television content playing parameter, determined using data acquired from the television 580c, indicating that the content playing on the television 580c is the movie "Titanic," and a stove operational status parameter, determined using data acquired from the kitchen stove 580e, indicating that the kitchen stove 580e is set to on, may be used by the context determination module 531 to determine multiple current contexts, such as "movie time," as in row 604, and "dinner time," as in row 605.

The system described herein is not limited to the listed contexts, and many different contexts may be determined based on various combinations of environmental parameters and their corresponding values. A remote server or computing device, such as the speech recognition server 118, shown in FIG. 1, may perform all or a part of the functionality of the context determination module 531 and transmit the results to the context determination module 531.

The controllable device determination module 533 may determine the controllable devices 580 and/or the corresponding actions which may be controlled in the current context as determined by the context determination module 531. The user may configure the system to control one or more of the defined controllable devices 580, such as those shown in Table 1, in different contexts. That is, different controllable devices 580 may be controlled in different contexts. The user may additionally configure the system to perform specific actions for the controllable devices 580, such as those shown in Table 2, in different contexts. Each context and the corresponding controllable devices and actions may be stored in the database 542 of the memory 540.

FIG. 6B shows a chart of example contexts and corresponding devices controlled in each of the contexts in the context-based speech processing system 500. Referring to FIG. 6B, using the contexts described above in FIG. 6A, the user may configure the system to control one or more controllable devices 580 in different contexts. For example, as shown in row 606, the user may configure the system to control the vehicle 580a, the speaker device 580b, the television 580c, the lamp 580d, the kitchen stove 580e, the computing device 501, the garage door, and the door lock in the context of "at home." Further, as shown in row 607, the user may configure the system to control the vehicle 580a, the computing device 501, and the garage door in the context of "in vehicle." As shown in row 608, the user may configure the system such that in the context of "at work, in meeting," only the computing device 501 may be controlled. As shown in row 609, the user may configure the system such that in the context of "movie time," the speaker device 580b, the television 580c, and the lamp 580d may be controlled. As shown in row 610, the user may configure the system such that in the context of "dinner time," only the kitchen stove 580e may be controlled.

The system described herein is not limited to the combination of contexts and controllable devices shown in FIG. 6B. Different or additional combinations of contexts and controllable devices may be configured in the system.

Figure 6C:
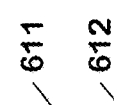
FIG. 6C shows a chart of example contexts and corresponding devices and actions controlled in each of the contexts in a context-based speech processing system.

FIG. 6C shows a chart of example contexts and corresponding devices and actions controlled in each of the contexts in the context-based speech processing system 500. Referring to FIG. 6C, the user may, alternatively or additionally, configure the system to control one or more controllable devices 580 and specific actions in each context. Using as an example, a case where the user configures the system such that the vehicle 380a, the computing device 501, the garage door, and the television 580c may be controlled in the "at home" and/or "in vehicle" contexts, the user may further configure the system with specific actions of those devices which may be controlled in each of the contexts.

For example, the user may configure the system such that in the context of "at home," certain, but not all, actions related to the vehicle 580a may be controlled. As shown in row 611, in the context of "at home," the user may configure the system to control the vehicle 580a to perform the actions of turning on the vehicle 580a, turning off the vehicle 580a, turning on the heat, and turning off the heat, but not the actions of accelerate, decelerate, turn on the radio, and turn off the radio. Likewise, as shown in row 611, in the context of "at home," the user may configure the system to control the computing device 501 to perform the actions of initiate a phone call, send email, and schedule an event; may configure the system to control the garage door to open the door and close the door, but not to stop; and may configure the television 580c to turn on, turn off, display the guide, and get information.

As shown in row 612, the user may configure the system such that in the context of "in vehicle," the vehicle 580a may be controlled to perform all of the actions related to the vehicle 580a, e.g., turning on the vehicle, turning off the vehicle, accelerating, decelerating, turning on the heat, turning off the heat, turning on the radio, and turning off the radio. The user may configure the system to control the computing device 501 only to initiate a phone call, but not to schedule an event or send an email in the context of "in vehicle." The user may configure the system to control the garage door to open the door, close the door, and stop in the context of "in vehicle." Further, the user may not configure the system to perform any actions related to the television 580c in the context of "in vehicle."

The system described herein is not limited to the combination of contexts, controllable devices, and actions shown in FIG. 6C. Different or additional combinations of contexts, controllable devices, and actions may be configured in the system.

The trigger word selection module 535 may select, from the corpus of trigger words, a subset of trigger words that are applicable in the current context as determined by the context determination module 531 and based on the controllable devices 580 and actions which are determined, by the controllable device determination module 533, to be controlled in the current context. The selected trigger words may be determined based on one or more trigger words configured as those that are applicable for a given context based on the devices and actions which should be controlled in that context. For each context, the user may configure the system to recognize one or more trigger words which may be used to control one or more of the controllable devices 580 and/or perform one or more actions. After the current context is determined by the context determination module 531, and the controllable devices 580 and corresponding actions that may be controlled in the context are determined by the controllable device determination module 533, the trigger word selection module 535 may limit, to the subset of trigger words which make up a domain of trigger words that are suitable for the current context, the trigger words that may be used in comparing to speech input. The trigger word selection module 535 may exclude all other words in the universe of trigger words from being used in the comparison to speech input.

One or more trigger words may be defined to trigger the computing device 501 to perform an action in response to the trigger word being recognized by the system. For example, Table 3 below, provides a plurality of trigger words which may be defined for various controllable devices 580 that may be controlled by the system. For example, the trigger words "turn on," "turn on the car," and "start" may be defined to cause the computing device 501 to perform the action of turning on the vehicle 580a, the trigger words "turn off," "turn off the car," and "stop" may be defined to control the computing device 501 to perform the action of turning off the vehicle 580a, "increase the speed," "go faster," and "accelerate" may be defined to control the computing device 501 to perform the action of accelerating the vehicle 508a, etc.

TABLE 3

| Controllable Devices | Actions | Trigger Words |
|---|---|---|
| Vehicle 580a | Turn on the vehicle | "turn on"; "turn on the car"; "start" |
| | Turn off the vehicle | "turn off"; "turn off the car"; "stop" |
| | Accelerate | "increase the speed"; "go faster"; "accelerate" |
| | Decelerate | "decrease the speed"; "slow down"; "decelerate" |
| | Turn on the heat | "turn on the heat" |
| | Turn off the heat | "turn off the heat" |
| | Turn on the radio | "turn on the radio" |
| | Turn off the radio | "turn off the radio" |
| Speaker device 580b | Turn on the speaker device | "turn on"; "turn on the speaker" |
| | Turn off the speaker device | "turn off"; "turn off the speaker" |
| | Adjust the volume up | "turn up"; "turn up the speaker" |
| | Adjust the volume down | "turn down"; "turn down the speaker" |
| Television 580c | Turn on the television | "turn on"; "turn on the TV" |
| | Turn off the television | "turn off"; "turn off the TV" |
| | Display the guide | "guide"; "show the guide"; "what else is on" |
| | Get information | "tell me more"; "get info" |
| Lamp 580d | Turn on the lamp | "turn on the light" |
| | Turn off the lamp | "turn off the light" |
| | Adjust the brightness up | "turn up the lights" |
| | Adjust the brightness down | "turn down the lights"; "dim" |
| Kitchen stove 580e | Turn on the kitchen stove | "turn on the stove"; "turn on the oven" |
| | Turn off the kitchen stove | "turn off the stove"; "turn off the oven" |
| | Set the temperature | "set oven to" |
| Microphones $550_{1-n}$ | Turn on the microphone | "turn on mic 1"; "enable mic 1" |
| | Turn off the microphone | "turn off mic 1"; "disable mic 1" |
| Computing device 501 | Initiate a phone call | "call"; "dial"; "phone" |
| | Send an email | "send email" |
| | Schedule an event | "schedule a meeting for" |
| Garage door | Open the garage door | "open"; "open the door" |
| | Close the garage door | "close"; "close the door" |
| | Stop opening or closing the garage door | "stop"; "stop the door" |
| Parking meter | Add time to the meter | "add minutes"; "add hours" |
| Front door lock | Lock the door | "lock the door"; "lock" |
| | Unlock the door | "unlock the door"; "unlock" |

As shown in Table 3, a single trigger word may be associated with one or more actions of different controllable devices 580. For example, the trigger word "turn on" may be associated with an action to turn on the television 580c, an action to turn on the speaker device 580b, and an action to turn on the vehicle 580a.

Additionally, multiple trigger words may be used for performing a single action of a controllable device 580. For example, as shown in Table 3, for the action to turn on the vehicle 580a, the trigger words "turn on," "turn on the car," and "start" may all be associated with the action, and the trigger words "turn off," "turn off the car," and "stop" may all be associated with the action to turn off the vehicle 580a. Additionally, a single action of a controllable device 580 may be associated with different trigger words which are recognized in different contexts.

FIG. 6D shows a chart of example contexts, corresponding devices and actions controlled in each of the contexts, and corresponding trigger words for controlling the devices and actions in the context in a context-based speech processing system 500. Referring to FIG. 6D, a plurality of trigger words are shown for controlling the vehicle 580a in the contexts of "at home" and "in vehicle." The user may configure the system to recognize different trigger words for controlling the controllable device 580 to perform a single action in different contexts. For example, the user may configure the system to recognize only the trigger word "turn on the car" to perform the action of turning on the vehicle 580a if the current context is "at home," as shown in row 613. The user may configure the system to recognize different or additional trigger words, such as "turn on," "turn on the car," and "start" to perform the same action of turning on the vehicle 580a in the context of "in vehicle," as shown in row 614. That is, if the speaker is in the home, the words "turn on" and "start" may be too ambiguous to control the vehicle 580a, as there may be multiple controllable devices 580 in the home which may be controlled to be turned on.

If a single trigger word is associated with more than one controllable device 580 and/or action, the controllable device 580 which is to be controlled and the corresponding action which is to be performed may be dependent on the current context determined by the context determination module 531. For example, if the trigger word "unlock" is associated with both an action of unlocking the vehicle 580a and an action of unlocking the front door of a home, then in the context of being "near the vehicle," the trigger word "unlock" may control the door of the vehicle 580a to be unlocked, and in the context of being "near the front door" the same trigger word may control the front door of the home to be unlocked.

The user may configure the system with the one or more trigger words that correspond with each action that the system may control the controllable device 580 to perform. Alternatively or additionally, the system may be preconfigured with one or more trigger words for each action that the system may control the controllable device 580 to perform.

Each context, the controllable devices 580 and actions, and the associated trigger words that control the controllable device 580 and/or action may be stored in a database 542 of the memory 540 of the computing device 501.

The trigger word selection module 535 may select the subset of trigger words applicable in each context based on the trigger words defined for the controllable devices 580 and the actions mapped to that context. For example, referring to FIG. 6D, if the context determination module 531 determines the current context as "at home," and the controllable device determination module 533 determines that the vehicle 580a, the computing device 501, the garage door, and the television 580c are to be controlled in the context of "at home," the trigger word selection module 535 may select, from the database 542, the trigger words "turn on the car," "turn off the car," "turn on the heat," "turn off the heat," "call," "dial," "phone," "send an email," "schedule a meeting for," "open the door," "close the door," "turn on the TV," "turn off the TV," "guide," "show the guide," "what else is on," "tell me more," and "get info," as shown in rows 613 and 615.

If the context determination module 531 determines the current context as "in vehicle," and the controllable device determination module 533 determines that the vehicle 580a, the computing device 501, and the garage door are to be controlled in the context of "in vehicle," the trigger word selection module 535 may select, from the database 542, the trigger words "turn on," "turn on car," "start," "turn off," "turn off the car," "stop," "increase the speed," "go faster," "accelerate," "decrease the speed," "go slower," "decelerate," "turn on the heat," "turn off the heat," "turn on the radio," "turn off the radio," "call," "dial," "phone," "open," "open the door," "close," "close the door," "stop," and "stop the door," as shown in rows 614 and 616.

The current context may be determined as multiple contexts. For example, if the context determination module 531 determines the current context as both as "movie time" and "dinner time," as in FIG. 6B, and the controllable device determination module 533 determines the controllable devices 580 to be controlled in these contexts as the speaker device 580b, the television 580c, the lamp 580d, and the kitchen stove 580e, the trigger word selection module 535 may select, from the database 542, the trigger words that the user has defined for the speaker device 580b, the television 580c, the lamp 580d, and the kitchen stove 580e in the contexts of "movie time" and "dinner time." The selected trigger words may be displayed on the display device 560 or may be output via the speaker 590.

A remote server or computing device, such as the speech recognition server 118, shown in FIG. 1, may perform all or a part of the functionality of the trigger word selection module 535 and may transmit the results to the trigger word selection module 535. For example, if the remote server or computing device performs trigger word selection, the remote server or computing device may transmit the selected trigger words to the computing device 501.

The system described herein is not limited to the combination of contexts, controllable devices, and actions shown in FIG. 6D. Different or additional combinations of contexts, controllable devices, and actions may be configured in the system.

The speech recognition module 537 may receive a speech input from the microphones 550$_{1-n}$. For example, the primary microphone 550$_1$ may detect speech in the vicinity of the computing device 501. The processor 510 may control to capture and transmit the speech to the speech recognition module 537 for processing. The speech recognition module 537 may interpret the speech to ascertain the words contained in the speech. The speech recognition module 537 may use one or more acoustic models and one or more language models in interpreting the speech. Further, the speech recognition module 537 may be implemented in software, hardware, firmware and/or a combination thereof. The processor 510 may alternatively, or additionally, transmit the speech to a remote server or computing device for processing, such as to the speech recognition server 119, shown in FIG. 1. In this case, the remote server or computing device may be used to process the entire received speech or a portion of the received speech and transmit the results to the speech recognition module 537.

The speech recognition module 537 may determine that the speech is unable to be interpreted using the one or more acoustic and/or language models, based on poor results returned from the models. The determination of poor results may be met when the results do not met a predetermined threshold. As a result, the speech recognition module 537 may determine that the speech needs to be disambiguated to determine what the speaker spoke, and the processor 510 may control the disambiguation module 538 to further process the speech.

The speech recognition module 537 may make the determination about the need for further processing of the speech after either processing an initial portion of an utterance for interpretation or processing the entire utterance for interpretation. If the determination is made after an initial portion of an utterance is processed for interpretation, the speech recognition module 537 may instruct the processor 510 to control the disambiguation module 538 to perform one or more functions prior to the speech recognition module 537 attempting to process the remaining portion of the utterance. Alternatively, the already processed initial portion of speech may be passed to the disambiguation module 538 for performing one or more functions to further process the speech.

If the determination about the need for further processing of the speech is made after the entire utterance is processed for interpretation, the speech recognition module 537 may instruct the processor 510 to control the disambiguation module 538 to perform one or more functions and may then request that the speaker re-speak the utterance and the second speech input may be processed by the speech recognition module 537. Alternatively, the already processed speech may be passed to the disambiguation module 538 for performing one or more functions to further process the speech.

If the results from the acoustic and/or language models met the predetermined threshold, the speech captured and processed by the speech recognition module 537 may be compared to the trigger words selected by the trigger word selection module 535. For example, referring to rows 613 and 615 in FIG. 6D, if the context determination module 531 determines the current context as "at home," and the controllable device determination module 533 determines that the vehicle 580a, the computing device 501, the garage door, and the television 580c are to be controlled in the context of "at home," the trigger word selection module 535 may select, from the database 542, the trigger words "turn on the car," "turn off the car," "turn on the heat," "turn off the heat," "call," "dial," "phone," "send an email," "schedule a meeting for," "open the door," "close the door," "turn on the TV," "turn off the TV," "guide," "show the guide," "what else is on," "tell me more," and "get info." In this case, the speech recognition module 537, after receiving and processing the speech input, may compare the speech input to only the trigger words selected by the trigger word selection module 535. The speech recognition module 537 may subsequently determine whether a match is found. If a single match is found, the system may pass the matched trigger word to the action determination module 539 to determine an action to be performed. However, if a match is not found, the processor 510 may control the disambiguation module 538 to further process the captured speech.

If more than one match is found, the processor 510 may control the disambiguation module 538 to further process the speech. More than one match may occur where multiple microphones $550_{1-n}$ are enabled and the speech recognition module 537, when processing the speech, receives different interpretations or transcriptions from the acoustic and language for the different microphones $550_{1-n}$. In such cases, the speech recognition module 537 may determine that the speech needs to be disambiguated to determine what the speaker actually spoke. In this case, the processor 510 may control the disambiguation module 538 to further process the speech.

If no match is found, the processor 510 may control the disambiguation module 538 to further process the speech in an attempt to determine if the speech was misinterpreted or if the speaker was attempting to speak a valid trigger word, but misspoke, perhaps because she was unaware of the valid trigger words for the current context.

The disambiguation module 538 may perform one or more disambiguation functions to disambiguate speech captured by one or more of the microphones $550_{1-n}$ and processed by the speech recognition module 537. For example, in processing the speech received from one of more of the microphones $550_{1-n}$, the speech recognition module 537 may use one or more acoustic models and one or more language models to interpret the speech. The speech recognition module 537 may determine that the results received from such models do not met a predetermined threshold; that the models return different transcriptions for the same speech, e.g., if speech was received from more than one microphone $550_{1-n}$, and, thus, multiple valid trigger word matches are made; or that simply no valid trigger word match was found. In such cases, the disambiguation module 538 may perform one or more functions to further process the speech.

The disambiguation module 538 may perform a microphone adjustment function. For example, if the models used by the speech recognition module 537 return results that do not meet a predetermined threshold, the disambiguation module 538 may determine that the microphone used to capture the speech, e.g. the primary microphone $550_1$, is not the best microphone for capturing the speech for a variety of reasons, e.g., due to distance from the speaker, the fidelity of the microphone, the sensitivity of the microphone, etc. As a result, the disambiguation module 538 may instruct the processor 510 to disable the primary microphone $550_1$ while enabling one or more of the secondary microphones $550_{2-n}$. Alternatively, the disambiguation module 538 may instruct the processor 510 to enable one or more of the secondary microphones $550_{2-n}$ without disabling the primary microphone $550_1$. The disambiguation module 538 may also instruct the processor 510 to adjust one or more settings, such as the frequency, sensitivity, polar pattern, fidelity, sample rate, etc., associated with one or more of the microphone $550_{1-n}$. The system may additionally perform a combination of enabling, disabling, and adjusting the settings of the microphones $550_{1-n}$. After making such adjustments, the processor 510 may instruct the speech recognition module 537 to continue processing speech received from the microphones $550_{1-n}$.

The disambiguation module 538 may perform a system replacement disambiguation function. For example, if the models used by the speech recognition module 537 return multiple interpretations/transcriptions for the same speech, the disambiguation module 537 may attempt to disambiguate the processed speech by determining whether a synonym for the processed speech can be determined. For example, if the models used by the speech recognition module 537 return two different transcriptions for the same utterance, for example "tell me more" and "open the door," where both transcriptions correspond to valid trigger words for the current context, the processor 510 may determine whether a synonym exists for either of the transcribed trigger words. That is, whether a synonym exists for "tell me more" or "open the door." If a synonym exists, the disambiguation module 538 may use the synonym to illicit clarification on the speaker's intended request. For example, the database 542, of the memory 540, may store a synonym table containing a mapping of trigger words to synonyms, e.g., commonly used words or phrases intended to have the same meaning as a given trigger word. For example, the database 542 may store a mapping such as that shown in Table 4.

TABLE 4

| Trigger Word | Synonyms |
| --- | --- |
| "increase the speed" | "increase acceleration" |
| | "speed up" |
| "tell me more" | "look up more info" |
| | "look up more information" |
| | "look up additional info" |
| | "look up additional information" |
| | "tell me about that" |
| "guide" | "what's on TV" |
| | "what's on television" |
| | "what's playing" |
| | "show me the guide" |
| | "what's on" |
| "record it" | "save the program" |
| | "record the program" |
| "who's at the door" | "who's there" |
| | "who is it" |
| | "who" |

If the speech recognition module 537 returns two (or more) different transcriptions, for example "tell me more" and "open the door," for the same utterance and both are valid trigger words for the current context, to determine which transcription was correct, the disambiguation module 538 may determine whether a synonym exists for either of the transcribed words (e.g., "tell me more" and "open the door"). The disambiguation module 538 may use the synonym in presenting a challenge question (e.g., "did you mean . . . ?") to the speaker to illicit clarification on the speaker's original request. For example, the disambiguation module 538 may determine that there is one or more synonyms for the trigger word "tell me more." The disambiguation module 538 may select one of these synonyms, at random or based on a priority assigned to the synonym, and use the synonym in presenting a challenge question to the speaker. For example, the disambiguation module 538 may select the synonym "look up more info" and control the computing device 501 to output the challenge question "did you mean look up more info?" to the speaker. The challenge question may be output via a speaker 590 or display 560 of the computing device 501.

The synonym disambiguation function may also be used for invalid trigger words—i.e., speech not matched to a valid trigger word. The disambiguation module 538 may determine whether speech which is determined not to be a valid trigger word is a synonym for a valid trigger word. For example, referring again to Table 4, if the speaker asks the system to "increase the acceleration" and the system determines that "increase acceleration" is not a valid trigger word in the currently defined context, the disambiguation module 538 may determine, using the synonym table stored in the database 542, that "increase acceleration" is a synonym for the valid trigger word "increase the speed." The disambiguation module 538 may present a challenge question asking the speaker, for example, "did you mean increase the speed?" Alternatively, a challenge question may not be asked, and the processor 510 may simply control the action determination module 539 to determine one or more actions to perform based on the trigger word "increase the speed."

The synonyms stored in the synonym table may be user defined or may be learned from an analysis of previously captured unmatched speech which after repeated attempts by the user eventually results in a match. For example, the synonyms "look up more info," "look up more information," "look up additional info," "look up additional information," and "tell me about that" mapped to the trigger word "tell me more," may have been learned upon the speaker not knowing the valid trigger word for getting additional information about a program being displayed on the television 580c. In this case the user may have asked the system to "look up more info" and upon getting no response from the system because the speech does not match a valid trigger word, may have asked "look up more information" and again after getting no response due to unmatched speech may have asked "look up additional info," and then "look up additional information," before remembering that the valid trigger word was "tell me more." On a separate occasion, the user may have asked "tell me about that" before remembering the trigger word was "tell me more." In each of these cases, the system may store the speech for each of the unmatched requests as synonyms associated with the final valid trigger word. The system may determine to store the speech as synonyms based on the speech being received in succession, e.g., within a predetermined time period from the previous speech, such as 5 seconds, 10 seconds, etc.

The disambiguation module 538 may perform a speaker profile disambiguation function. For example, if the models used by the speech recognition module 537 return multiple interpretations/transcriptions for the same speech, the disambiguation module 538 may attempt to disambiguate the processed speech by determining who the likely speaker is. In particular, the disambiguation module 538 may attempt to determine a profile of the speaker.

Figure 10A:
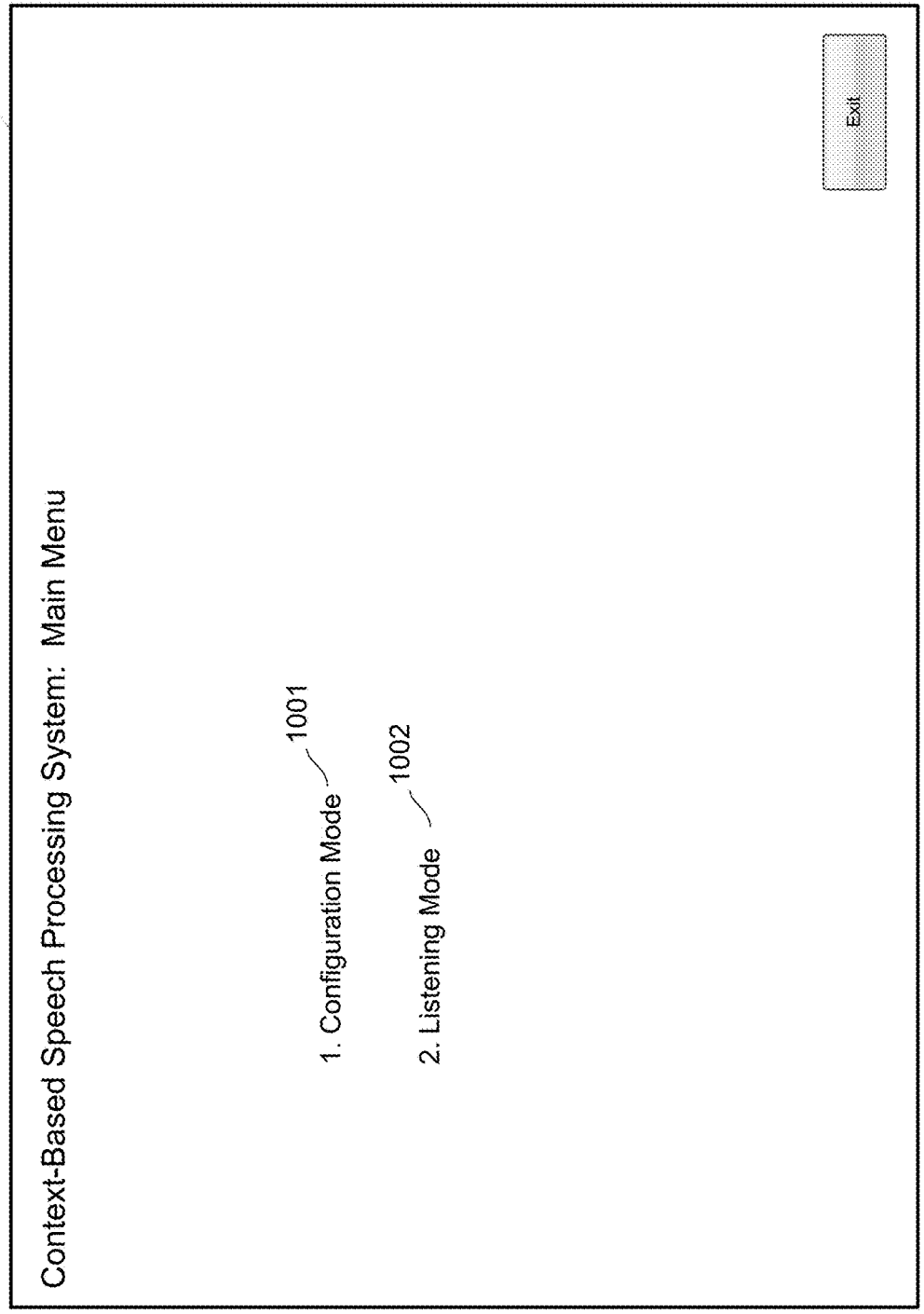
Figure 10B:
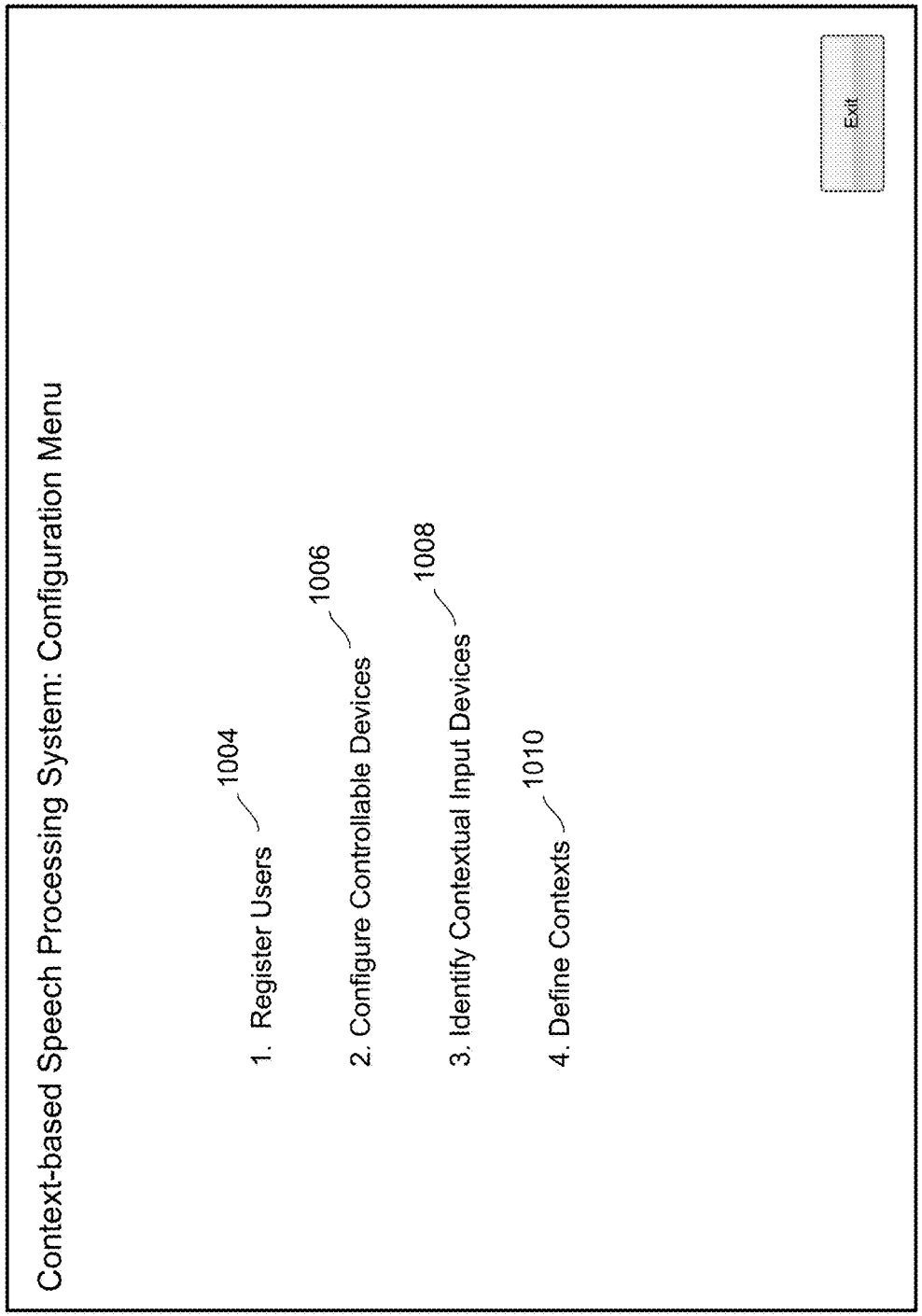

Each user of the system may be registered. Information related to the user may be stored in the database 542 of the memory 540 in a user profile associated with the user. The user profile may comprise information such as the user's name, gender, age, height, weight, identification information related to devices used by the user to perform the features described herein, system authorization level (described in further detail with respect to FIG. 10C), etc. A voice sample and an image of the user may be stored with the user profile. The voice sample may be used for calibrating the system to understand the user's speech pattern, pitch, cadence, energy, etc. A history of commands/speech spoken by the user may be stored with the user profile.

The disambiguation module 538 may engage various sensors, such as cameras, microphones, etc., to capture information about the speaker and determine a likely user profile associated with the speaker. For example, the disambiguation module 538 may engage a camera to capture the size of the speaker's face and an approximate height of the user. The disambiguation module 538 may further engage a microphone to capture the speaker's speech pattern, pitch, cadence, etc. while speaking. The disambiguation module 538 may compare this information with stored user profile information to determine a corresponding user profile. The disambiguation module 538 may determine, based on information associated with the determined user profile, what the speaker likely asked. For example, if the speech recognition module 537 returns the transcriptions of "tell me more" and "open the door," for the same utterance and both are valid trigger words for the current context, the disambiguation module 538 may determine, based on determined user profile, that the speaker is more likely to have said "tell me more" as the speaker had not in the past said "open the door." The disambiguation module 538 may use other information associated with the user profile to determine what the speaker likely said. For example, if the determined user profile indicated that the user was a child, the disambiguation module 538 may determine that it is not likely that a child would say "open the door." The information used by the disambiguation module 538 to determine the likely speech is not limited to the above noted information and may comprise other information or a combination of information.

The disambiguation module 538 may perform an integrated contextual disambiguation function. For example, if the models used by the speech recognition module 537 return results which do not meet a predetermined threshold or return multiple interpretations/transcriptions for the same speech, the disambiguation module 538 may attempt to disambiguate the processed speech by determining what else is happening in the system. For example, the disambiguation module 538 may gather information from other devices in the system, such as head ends, networks, gateways, home security systems, video cameras, set-top boxes, etc. to determine what is currently happening in the system. For example, the disambiguation module 538 may determine from information gathered from a network or gateway whether a user is attempting to add a device to the network; or may determine from images captured from a video camera that someone is standing outside of the home at the front door, etc. The disambiguation module 538 may use the information gathered from the system to disambiguate speech.

If the models used by the speech recognition module 537 return two different transcriptions for the same utterance, for example "tell me more" and "open the door," the disambiguation module 538 may gather information from a video camera and determine that someone is standing outside of the home at the front door. The disambiguation module may use this information to disambiguate the speech and determine that the speaker likely said "open the door."

A speaker may say "put X on my network" and the models used by the speech recognition module 537 may be unable to understand what "X" is. As a result, the models may return results not meeting a predetermined threshold or return multiple interpretations for "X." In this case, the disambiguation module 538 may gather information from the network to determine whether any new device has recently tried to connect to the network. The disambiguation module 538 may obtain the MAC address of any such device, which may suggest that the device is manufactured by APPLE™. The disambiguation module 538 may use this information to disambiguate the speech "X" by favoring the names of products manufactured by APPLE™.

While a number of disambiguation functions have been described, the disambiguation module 538 may employ other or additional functions to disambiguate speech. The disambiguation module 538 may employ a combination of the functions to disambiguate speech. For example, if the speaker says "put X on my network" and the speech recognition module 537 is unable to understand what "X" is and, thus, returns results not meeting a predetermined threshold or returns multiple interpretations for "X," the disambiguation module 538 may employ the speaker profile disambiguation function together with the integrated contextual disambiguation function to first determine a likely user profile associated with the speaker, in accordance with the description provided above, and then use the registered device information associated with the user profile to determine which device "X" likely refers to.

A speaker may be watching a program on the television 580c and wish to instead watch the program from a different device. The speaker may say "I want to watch this from my phone" and the models used by the speech recognition module 537 may be unable to interpret what "this" and "phone" refer to. In this case, the disambiguation module 538 may gather information from the television 580c or a connected set-top box to determine what the user is currently watching. The disambiguation module 538 may further determine a user profile likely associated with the speaker, and use the registered device information associated with the user profile to determine a phone associated with the user profile.

After the speech has been disambiguated by the disambiguation module 538, the system may again attempt to match the speech with a valid trigger word. If the speech cannot be matched with a valid trigger word the system may perform one or more additional disambiguation functions or may cease attempts to disambiguate the speech. Once the speech is matched with a valid trigger word, the trigger word may be passed to the action determination module 539.

The action determination module 539 may determine one or more actions to perform based on speech received and matched to a trigger word by the speech recognition module 537 and/or the disambiguation module 538. That is, if a speech input is matched to one of the trigger words selected by the trigger word selection module 535 based on the context determined by the context determination module 531, the action determination module 539 may determine one or more actions which correspond to the matched trigger word for the current context, and the computing device 501 may control to perform the determined one or more actions.

The system described herein is not limited to the controllable devices 580, the combination of contexts and controllable devices 580, or the combination of contexts, controllable devices, and actions shown and described above. Any number of different combinations may be applicable.

Figure 7:
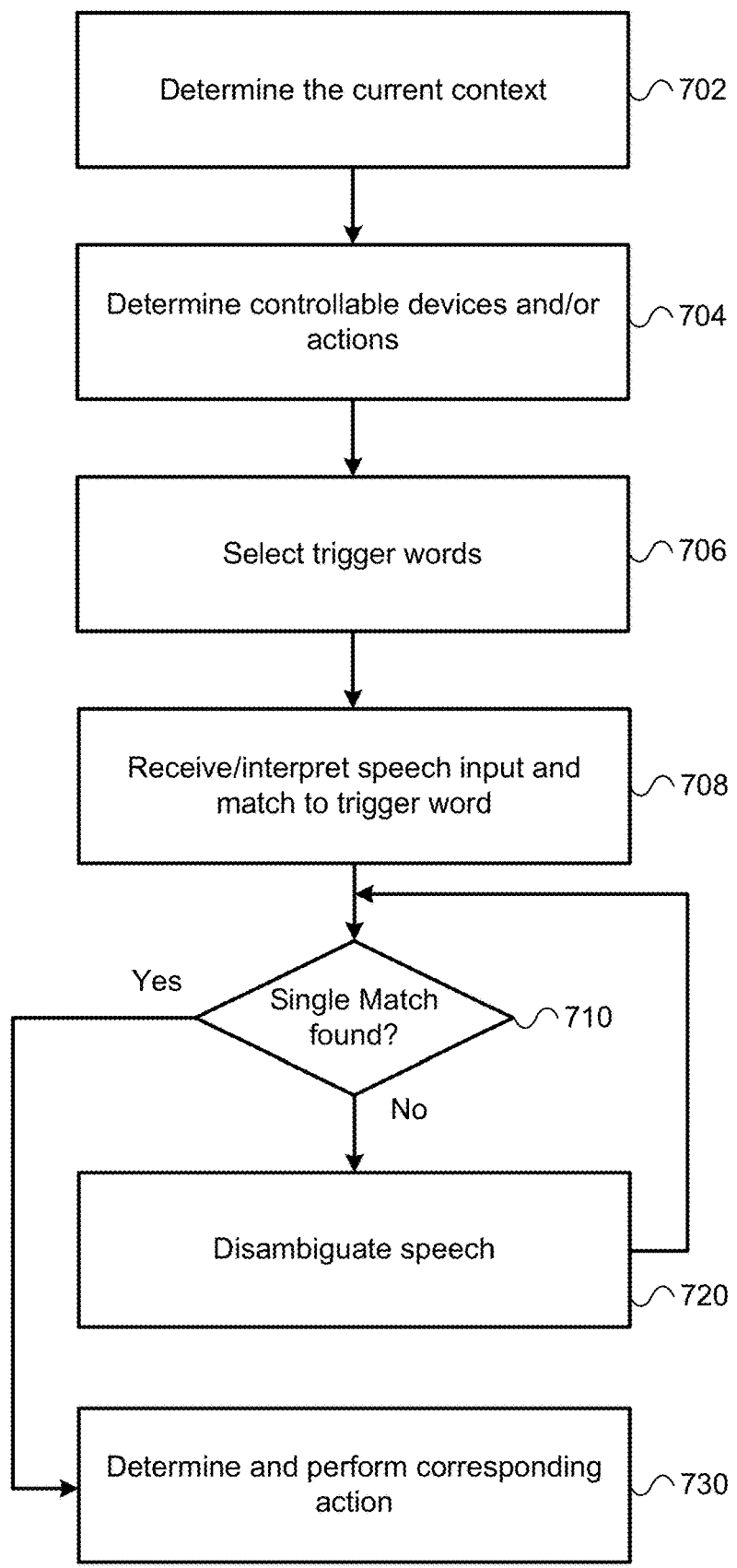
FIGS. 7, 8, and 9A-9D show flowcharts of example methods of a computing device used in a context-based speech processing system.

FIG. 7 is a flowchart of a method of the computing device 501 for processing speech in the context-based speech processing system 500. Referring to FIG. 7, at step 702, the context determination module 531 of the computing device 501 may determine the current context. That is, the current determination module 531 may acquire data from various contextual input devices to determine values of one or more corresponding environmental parameters used to determine the current context. For example, referring back to FIG. 6A, as shown in row 601, environmental parameters, such as a vehicle seat status parameter, determined using data, acquired from a seat sensor of the vehicle 580a, indicating a seat in the vehicle 580a is occupied, and a speed parameter, determined using data from an accelerometer in the computing device 501 indicating that the computing device 501 is moving at a speed greater than a predetermined speed for a predetermined amount of time, may be used to determine the current context as the speaker being located "in vehicle."

At step 704, the controllable device determination module 533 of the computing device 501 may determine one or more controllable devices 580 and/or actions which may be controlled in the context of "in vehicle." For example, referring to FIG. 6C, the controllable device determination module 533 may determine the actions turn on the vehicle, turn off the vehicle, accelerate, decelerate, turn on the heat, turn off the heat, turn on the radio and turn off the radio for the vehicle 580a may be controlled, the action initiate a phone call for the computing device 501 may be controlled, and the action open the door, close the door, and stop for garage door to be controlled.

At step 706, the trigger word selection module 535 of the computing device 501 may select one or more trigger words to listen for in the context of "in vehicle" based on the controllable devices 580 and the actions determined by the controllable device determination module 533. For example, referring to FIG. 6D, the trigger word selection module 535 may select, from the database 542, the trigger words "turn on," "turn on the car," "start," "turn off," "turn off the car," "stop," "increase the speed," "go faster," "accelerate," "decrease the speed," "slow down," "decelerate," "turn on the heat," "turn off the heat," "turn on the radio," "turn off the radio," "call," "dial," "phone," "open," "open the door," "close," "close the door," "stop," and "stop the door," as shown in rows 614 and 616.

At step 708, the speech recognition module 537 may receive a speech input captured by one or more of the microphones $550_{1-n}$. The speech recognition module 537 may use one of more acoustic and language models to interpret the speech. The speech received by the speech recognition module 537 may then be compared to only those trigger words which were selected by the trigger word selection module 535 for the current context. Thus, if the speech input is "turn on," the speech may be compared to the selected trigger words "turn on," "turn on the car," "start," "turn off," "turn off the car," "stop," "increase the speed," "go faster," "accelerate," "decrease speed," "slow down," "decelerate," "turn on the heat," "turn off the heat," "turn on the radio," "turn off the radio," "call," "dial," "phone," "open," "open the door," "close," "close the door," "stop," and "stop the door," as shown in Table 3, to determine if there is a match.

At step 710, if the models used by speech recognition module 537 return results not meeting a predetermined threshold, if multiple trigger word matches are found, or if no match is found, the system may proceed to step 720 to attempt to further process the speech to disambiguate the speech. Otherwise, the system may proceed to step 730 to determine and perform an action corresponding to the matched trigger word.

At step 720, the disambiguation module 538 may perform one or more disambiguation functions to disambiguate speech that did not result in a single trigger word being matched. Upon disambiguating the speech, the disambiguation module 538 may compare the disambiguated speech to only those trigger words which were selected by the trigger word selection module 535 for the current context. If a single match is found, the system may proceed to step 730. If a single match is not found, the disambiguation module 538 may perform one or more additional disambiguation functions to continue to try to disambiguate the speech. The process may end after a predefined number of unsuccessful attempts.

At step 730, if the speech recognition module 537 determines that a single match is found, the action determination module 539 may determine one or more actions associated with the matched trigger word. Thus, in the case of the speech input of "turn on," a match may be found among the trigger words selected by the trigger selection module 535, and the action determination module 539 may determine the associated action as "turn on the vehicle." The computing device 501 may control the controllable device 580 to perform the determined one or more actions. That is, the computing device 501 may transmit a command to the controllable device 580 instructing the controllable device 580 to perform the one or more actions. In the above example, the computing device 501 may transmit a command to the vehicle 580a instructing the vehicle to turn on.

In certain contexts, it may be determined that multiple actions should be performed based on a single trigger word. For example, instead of the trigger word "turn on" simply turning on the vehicle 580, the user may have configured the system to cause both the vehicle 580a to be turned on and the heat in the vehicle 580a to be turned on using the trigger word "turn on" in the context of "in vehicle."

Further, if multiple contexts are determined, one or more actions may be triggered by a single trigger word. For example, if the contexts "movie time" and "dinner time" are determined, the system may be configured such that the trigger word "turn on" turns on both the television 580c and the kitchen stove 580e.

FIGS. 8 and 9A-9D are flowcharts showing a method of the computing device 501 used in the context-based speech processing system 500. FIGS. 10A-10J show example user interfaces associated with the context-based speech processing system 500. The method described with respect to FIGS. 8 and 9A-9D may be executed by the computing device 501 shown in FIG. 5.

Figure 8:
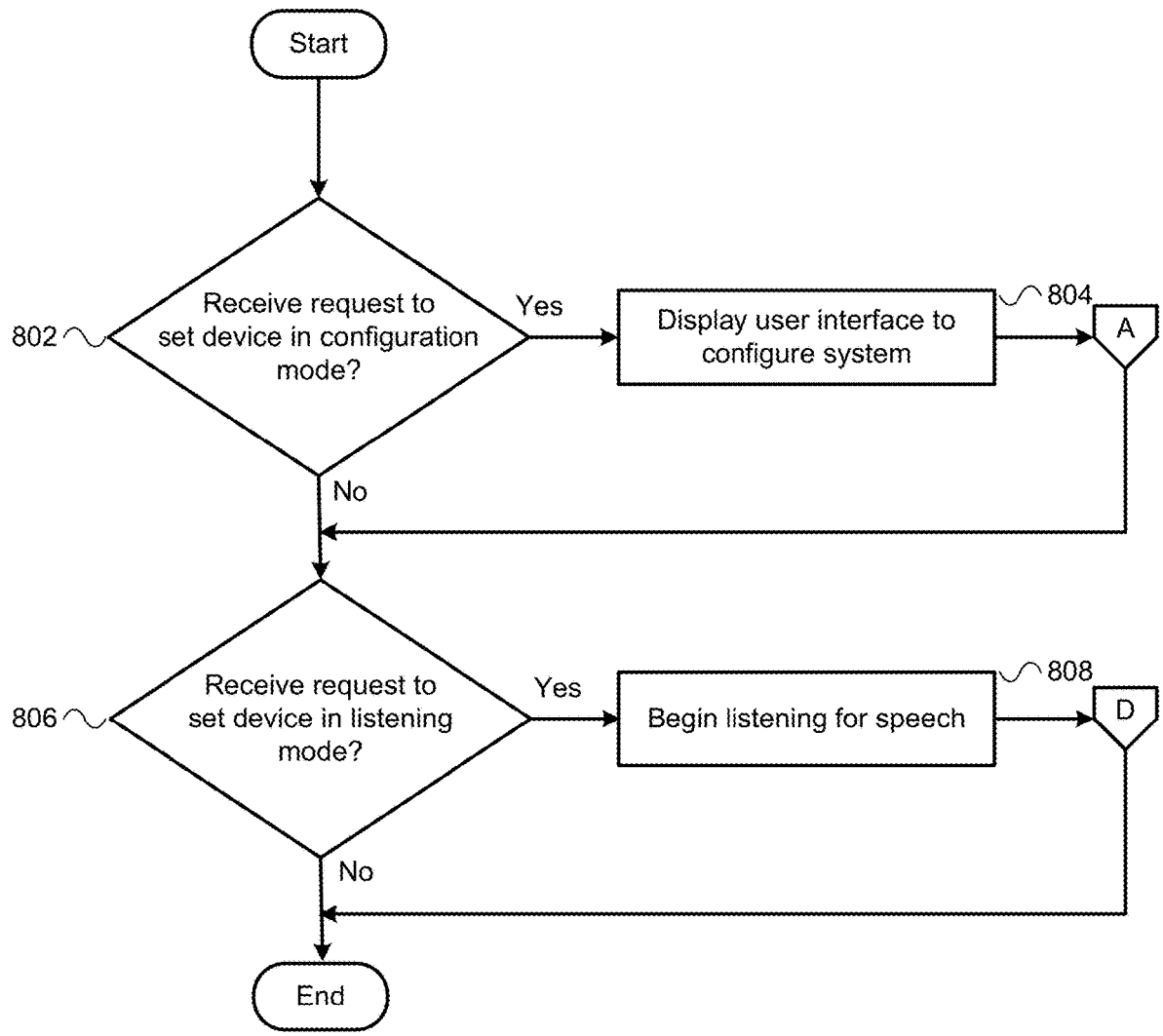

Referring to FIG. 8, at step 802, the computing device 501 may determine whether a request to enter into a mode for configuring the context-based speech processing system 500 is received. The request may occur by default upon an initial use of the computing device 501, such as when the device is initially plugged in or powered on. Alternatively or additionally, a user interface may be displayed on the display device 560 after the computing device 501 is plugged in or powered on, and the user interface may receive an input for requesting that the computing device 501 be entered into the configuration mode. The user interface may, alternatively or additionally, be accessed via a soft key displayed on the display device 560 or via a hard key disposed on an external surface of the computing device 501. For example, referring to FIG. 10A, a user interface screen 1000A may be displayed on the display device 560 after the computing device 501 is powered on or after a soft or hard key on the computing device 501 is pressed. The user interface screen 1000A may display a main menu having a first option 1001 for configuring the context-based speech processing system 500. The user may select the first option 1001 to enter the computing device 501 into the configuration mode.

If the request to enter the computing device 501 into a mode for configuring the context-based speech processing system 500 is received, then at step 804, the computing device 501 may display a user interface for configuring the context-based speech processing system 500. For example, referring to FIG. 10B, a user interface screen 1000B may be displayed on the display device 560. The user interface screen 1000B may display a menu for selecting various options for configuring the context-based speech processing system 500. The menu may provide a first option 1004 to register users, a second option 1006 to configure controllable devices, a third option 1008 to determine contextual input devices, and a fourth option 1010 to define contexts. The user interface for configuring the context-based speech processing system 500 is described in further detail with respect to FIGS. 9A-9C.

If a request to enter the computing device 501 into a mode for configuring the context-based speech processing system 500 is not received, then at step 806, the computing device 501 may determine whether a request to enter the computing device 501 into a mode for listening for speech is received. For example, the request to enter the computing device 501 into a mode for listening for speech may occur by default after the device is plugged in or powered on, where the computing device 501 has previously been configured. For example, during the configuration process, a setting may be enabled which causes the computing device 501 to thereafter default to listening mode upon being powered on or plugged in.

Alternatively or additionally, a user interface may be displayed on the display device 560 after the computing device 501 is plugged in or powered on, and the user interface may receive an input for requesting that the computing device 501 be entered into the listening mode. The user interface may, alternatively or additionally, be accessed via a soft key displayed on the display device 560 or via a hard key disposed on an external surface of the computing device 501. For example, referring back to FIG. 10A, the user interface screen 1000A may display a second option 1002 for entering the computing device 501 into a listening mode. The user may select the second option 1002 to enter the computing device 501 into the listening mode.

If the request to enter the computing device 501 into a mode for listening for speech is received, then at step 808 the computing device 501 may be entered into a listening mode to begin to listen for and process speech according to methods described herein. This step is described in further detail with respect to FIG. 9D.

If the request to enter the computing device 501 into a mode for listening for speech is not received, the method may end. Alternatively, the method may return to step 802 and may again determine whether the request for entering the computing device 501 into a configuration mode is received.

Figure 9A:
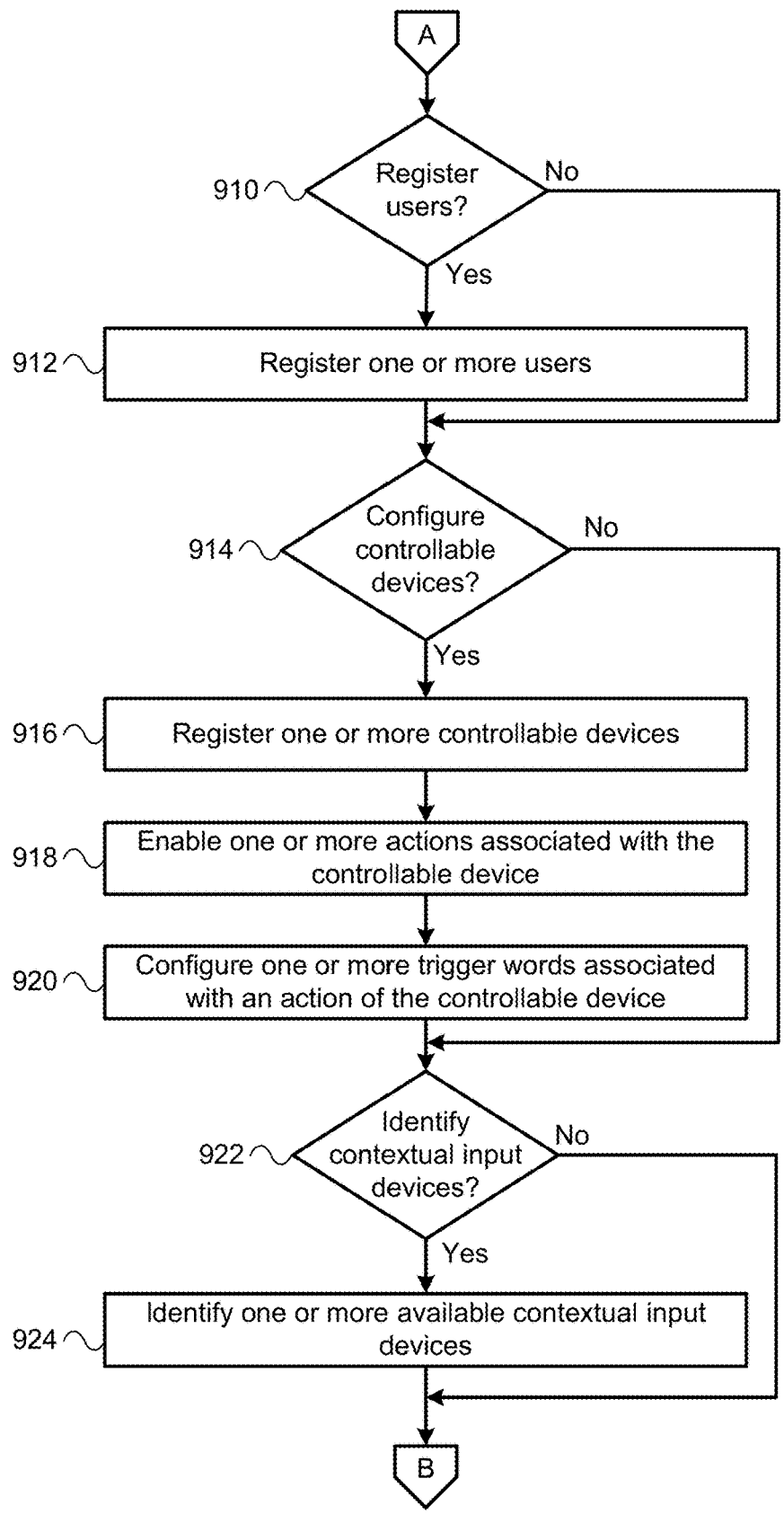

Referring to FIG. 9A, at step 910, the computing device 501 may determine whether a selection for registering a user is received in the user interface screen 1000A. That is, one or more users authorized to use the context-based speech processing system 500 may be registered with the system. If a selection for registering a user is received, the method proceeds to step 912, otherwise, the method proceeds to step 914.

At step 912, the computing device 501 may receive information for registering one or more users for using the context-based speech processing system 500. For example, referring to FIG. 10C, a user interface screen 1000C may be displayed on the display device 560 of the computing device 501. The user interface screen 1000C may be used to receive user profile information related to the user being registered, such as the user's name 1012, gender 1014, age 1016, system authorization level 1017, weight (not shown), height (not shown), etc. The system authorization level may correspond to the level of control the user has over the computing device 501 and/or the various controllable devices 580. The system authorization level may also determine a user's ability to configure the context-based speech processing system 500. The system authorization level may be classified as high, medium, and low. A high authorization level may allow the user full control of the computing device 501 and/or the various controllable devices 580 and may allow the user to configure the context-based speech processing system 500. On the other hand, a medium authorization level may allow the user some, but not full, control of the computing device 501 and/or various controllable devices 580 and may prevent to user from configuring some or all features of the context-based speech processing system 500. A low authorization level may allow the user only very limited or, in certain cases, even no control of the computing device 501 and/or various controllable devices 580. The system authorization level may use a scheme different from a high, medium, and low scheme. For example, the system authorization level may use a numerical scheme, such as values ranging from 1 to 3 or a different range of values.

The user profile information may be stored in the database 542 of the memory 540. The user profile information may be used in speech disambiguation in the manner described above. The user profile information may also be used in the context determination. For instance, a context related to the age of users watching television may be defined, so that in the case, for example, that the context determination module 531 determines that only children are watching television and no adults are present, a voice command received from one of the children for controlling the television 580c or an associated set-top box to make a video-on-demand purchase or to turn the channel to an age-inappropriate channel may not be applicable for the user due to her age—thus restricting the corresponding trigger words selected by the trigger word selection module 535. Similarly, a user having a low authorization level may be restricted from controlling the computing device 501 or the controllable device 580 from performing certain actions.

The user profile information which may be collected is not limited to the information shown in FIG. 10C, and may include other profile information related to the user. For example, additional profile information related to the user may be collected using the advanced settings 1020. The advanced settings 1020 may be used, for example, to register a device, such as a smartphone, a wearable device, etc. that the user may use to perform the features described herein. Multiple devices associated with a particular user may be registered in the system to perform the features described herein. Additionally a record voice sample 1018 setting may be provided for allowing the user to record their voice for calibrating the system to understand the particular user's speech. An image of the user may further be stored with the user profile information. After the registration of users is complete, the computing device 501 may return to the configuration menu on user interface screen 1000B shown in FIG. 10B.

Referring back to FIG. 9A, at step 914, the computing device 501 may determine whether a request to configure one or more controllable devices is received via the configuration menu on the user interface screen 1000B. For example, a user may configure the system to add a new device to be controlled by the system, such as the vehicle 580a or the speaker device 580b. It may not be necessary to add the computing device 501 as a controllable device as the computing device 501 may be controlled by default. If a request to configure one or more controllable devices 580 is received, the method proceeds to step 916, otherwise the method proceeds to step 922.

Referring back to FIG. 9A, at step 916, the computing device 501 may register one or more controllable devices 580 with the context-based speech processing system 300.

Figure 10D:
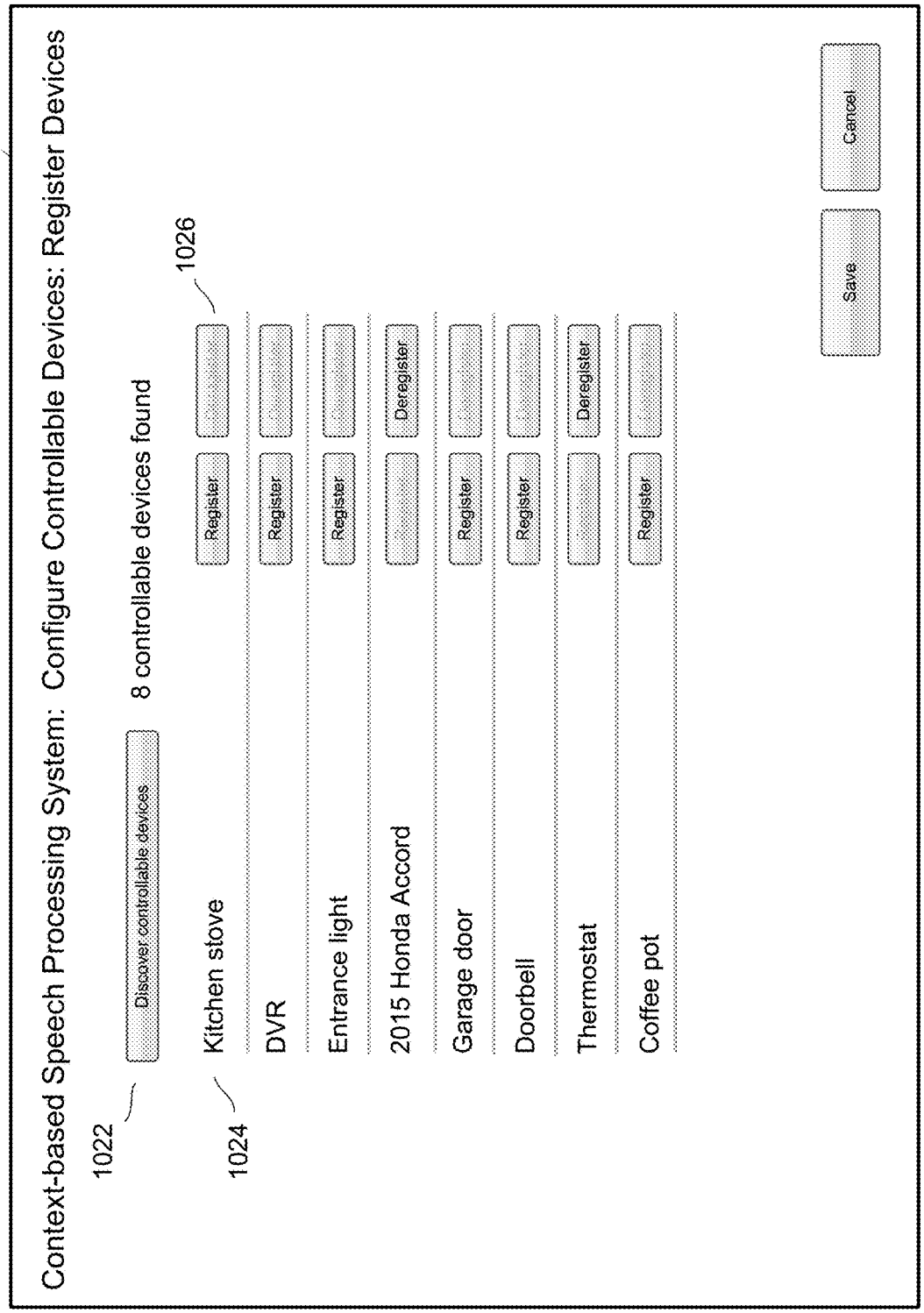
Figure 10E:
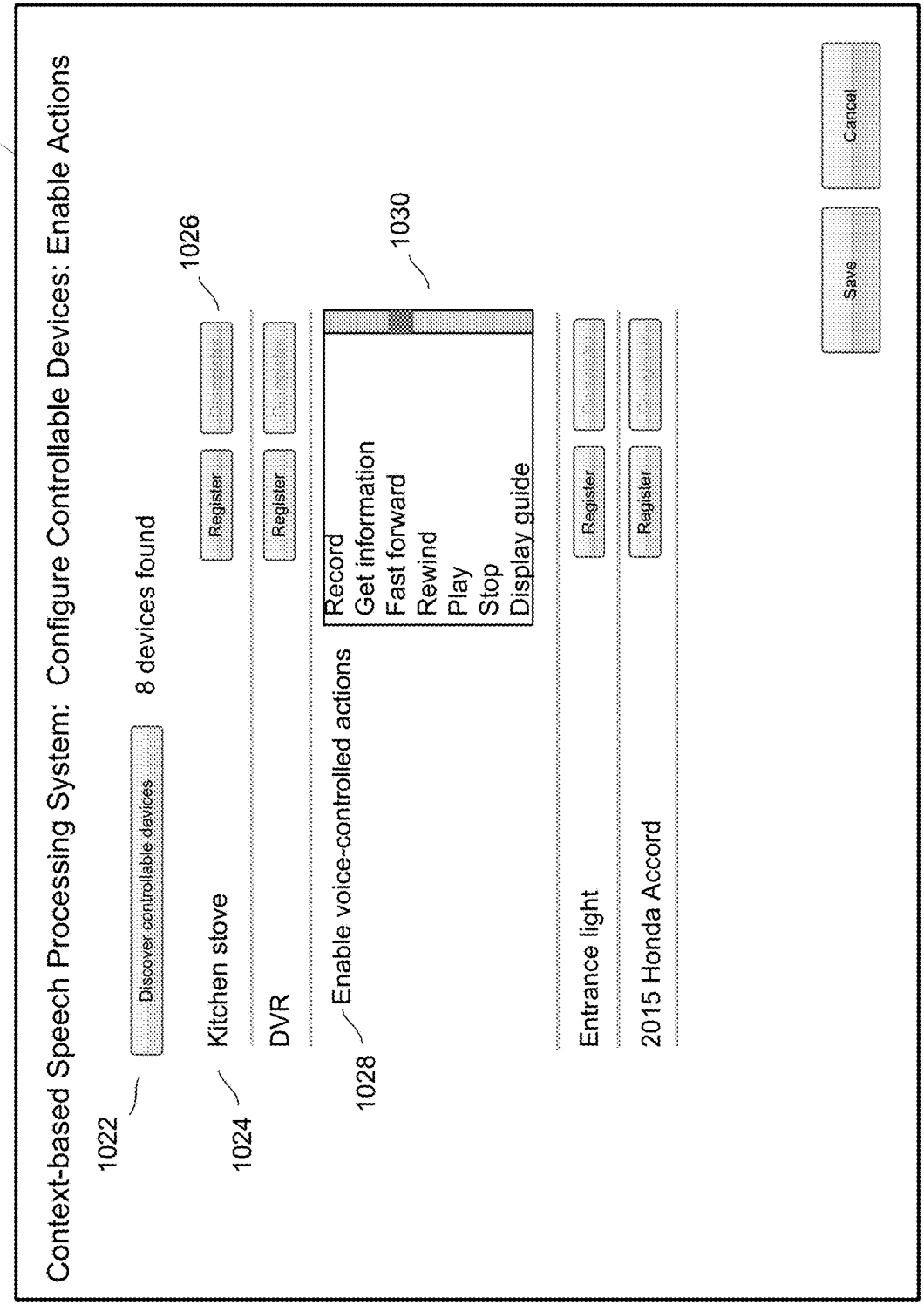
Figure 10F:
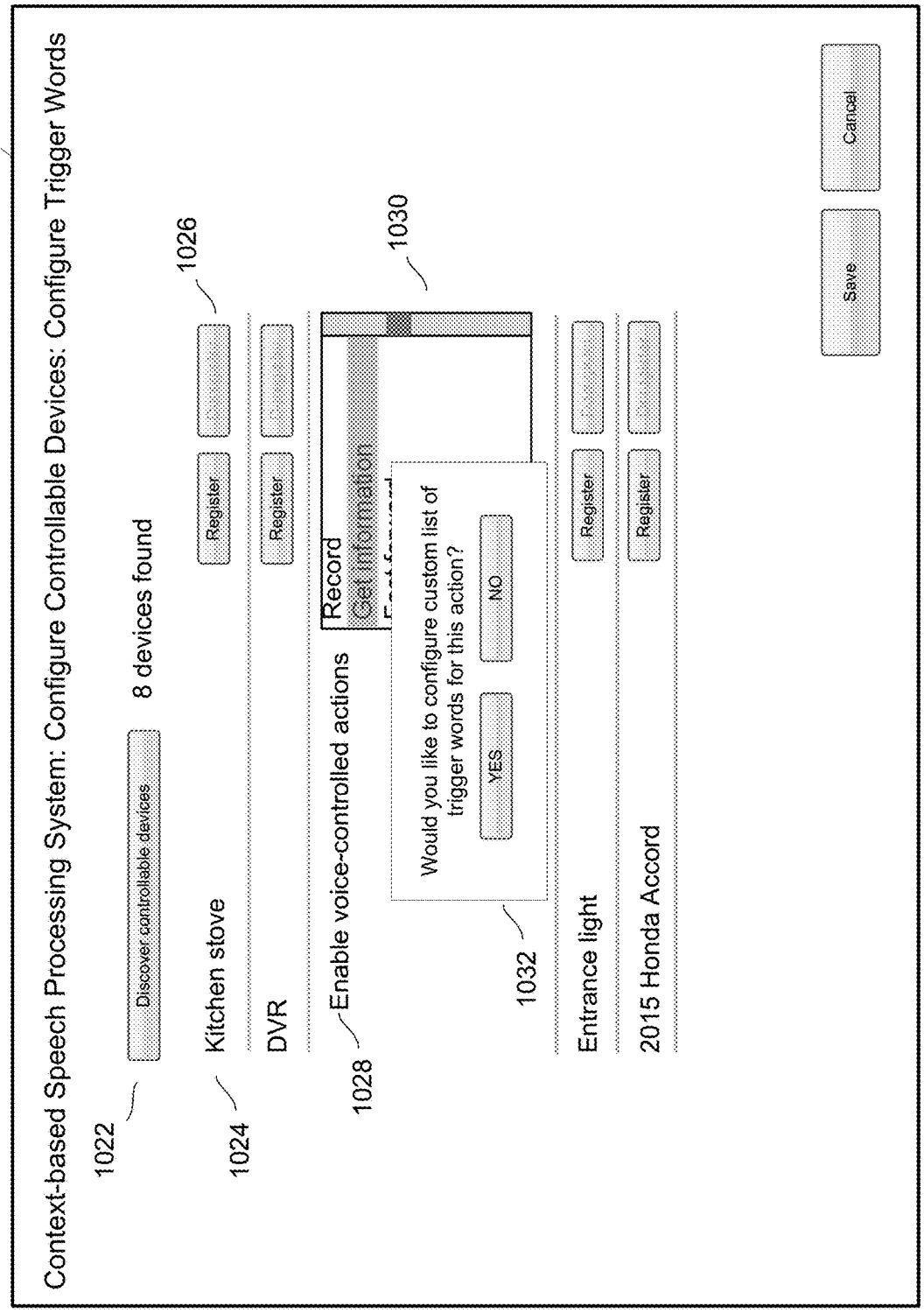

For example, referring to FIG. 10D, a user interface screen 1000D may be displayed on the display device 560 of the computing device 501. The user interface screen 1000D may be for registering one or more controllable devices 580 with the context-based speech processing system 500. The user interface screen 1000D may provide a button 1022 used to initiate a device discovery process for determining devices which are capable of control by the computing device 501. The device discovery process may determine devices in any number of ways, such as by determining devices which are connected to the network 570, determining devices within a certain range or proximity using communication protocols such as Bluetooth, Zigbee, Wi-Fi Direct, near-field communication, etc. A list 1024 of the discovered devices may be displayed on the user interface screen 1000D. The computing device 501 may receive a selection through the user interface screen 1000D, such as via a button 1026, to register one or more of the discovered devices as controllable devices 580. Once registered, the controllable devices 580 may additionally be deregistered to discontinue control of the device via the context-based speech processing system 500. The controllable devices 580 may be stored in the database 542 of the memory 540.

Referring back to FIG. 9A, at step 918, after registering one or more controllable devices 580, as set forth at step 916, the user may enable one or more actions associated with each of the registered controllable devices 580. For example, referring to FIG. 10E, a user interface screen 1000E may be displayed on the display device 560 of the computing device 501. The user interface screen 1000E may be for enabling one or more actions to be associated with each of the registered controllable devices 580. The user interface screen 1000E may be a view of the user interface screen 1000D after the user selects the button 1026 to register one of the controllable devices 580. In this instance, the computing device 501 may display on the display device 560 an option 1028 for enabling various actions related to the controllable device 580. The actions may be displayed in the list 1030. These may be actions pre-configured by the manufacturer of the controllable device 580 as actions or functions which are capable of voice control. The user may enable one or more actions for each of the registered controllable devices 580. The actions may be stored in the database 542 of the memory 540.

Referring back to FIG. 9A, at step 920, after enabling one or more actions associated with the controllable device 580, the user may configure one or more trigger words associated with each of the actions associated with the controllable device 580. For example, referring to FIG. 10F, a user interface screen 1000F may be displayed on the display device 560 of the computing device 501. The user interface screen 1000F may be a view of the user interface screen 1000E after the user selects one of the actions in the list 1030 to enable. In this instance, the computing device 501 may display a message 1032 inquiring whether the user would like to configure a custom list of trigger words for the action. If the user does not wish to configure a custom list of trigger words, the computing device 501 may default to using all of the trigger words predefined by the manufacturer for the action. The predefined list of trigger words may be pre-stored in the memory 540 or may be downloaded automatically from an external data source, such as a database associated with the manufacturer, when the controllable device 580 is initially registered with the context-based speech processing system 500, and stored in the memory 540 thereafter.

Figure 10G:
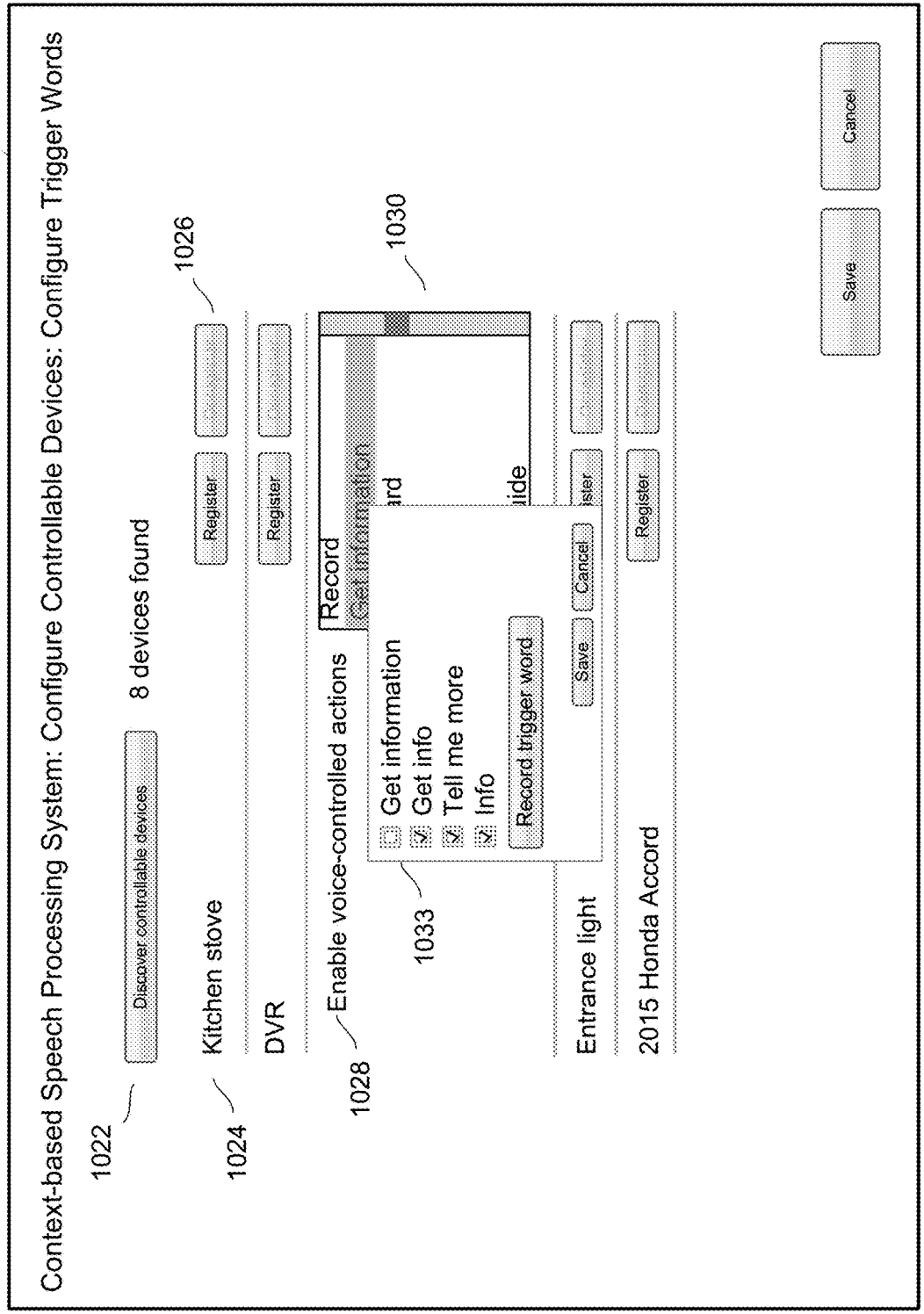

If the user does wish to configure a custom list of trigger words, referring to FIG. 10G, a user interface screen 1000G may be displayed for selecting trigger words to be associated with the action. The user interface screen 1000G may be a view of the user interface screen 1000F after the user indicates that they wish to configure a custom list of trigger words. As shown, the user may be provided with a list 1033 of trigger words which are associated with the action. The user may select one of more of the trigger words to include in the custom list of trigger words and may additionally or alternatively record their own words which will be used to trigger the associated action. The trigger words may be stored in the database 542 of the memory 540. The user may additionally configure a list of synonyms to be associated with each of the trigger words. The mapping of trigger words and synonyms may be stored in the database 542 of the memory 540. After the user has completed configuring the controllable devices 580, the computing device 501 may return to the configuration menu on user interface screen 1000B.

Referring back to FIG. 9A, at step 922, the computing device 501 may determine whether a request to determine contextual input devices is received via the configuration menu on the user interface screen 1000B. The request to determine contextual input devices may be for determining devices used to monitor the environment to determine the current context. For example, the contextual input device may be a camera, a fitness bracelet, a motion sensor, a GPS device, etc. Further, one or more of the controllable devices 580 may be used as a contextual input device. If a request to determine contextual input devices is received, the method proceeds to step 916, otherwise the method proceeds to step 918.

Figure 10H:
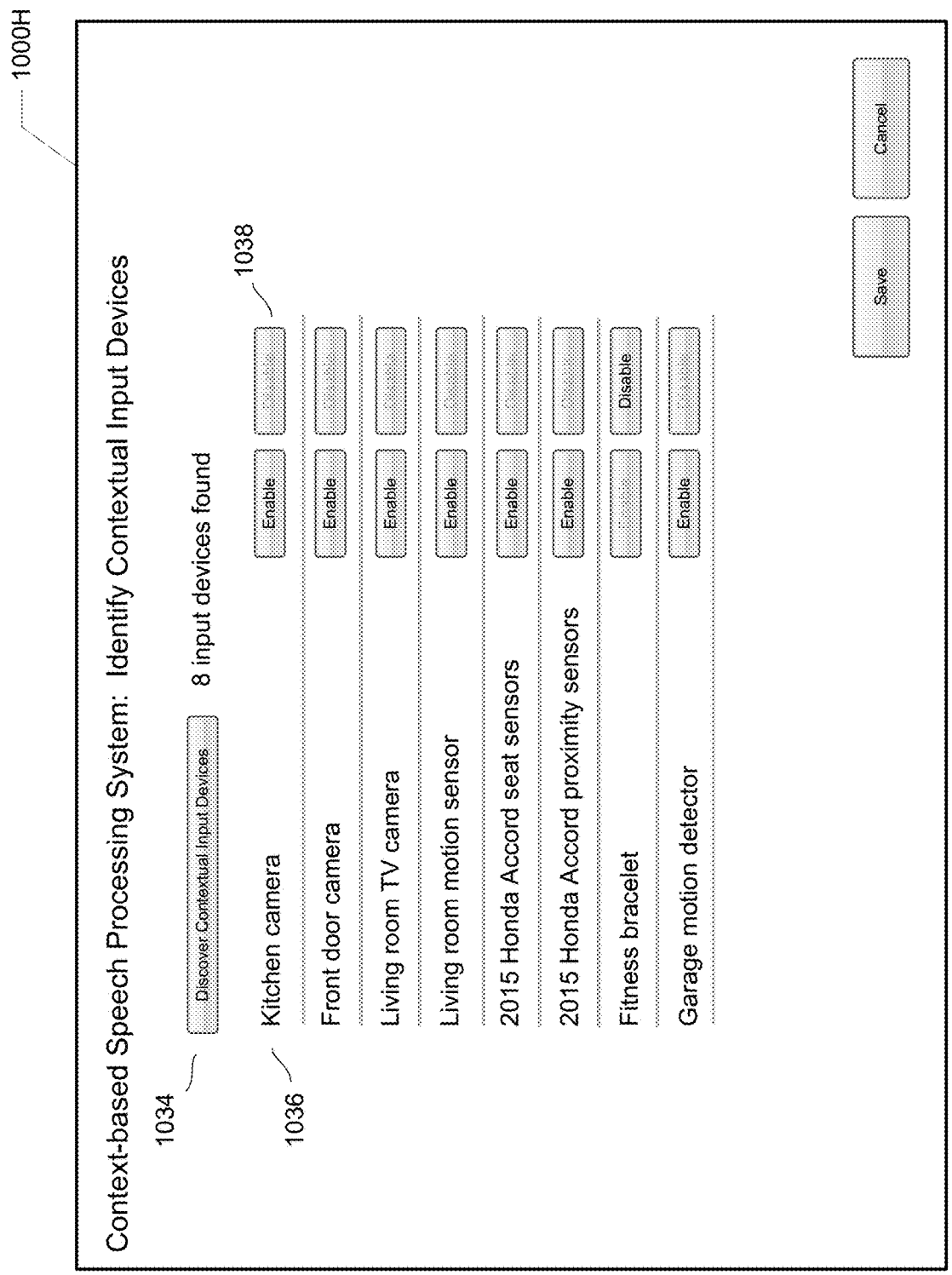

At step 924, the user may determine one or more available contextual input devices used to monitor the environment to determine the current context. Referring to FIG. 10H, a user interface screen 1000H may be displayed on the display device 560 of the computing device 501. The user interface screen 1000H may be for determining and enabling one or more contextual input devices which may be used to monitor the environment for determining the current context. Computing device 501 may acquire data from the one or more of the enabled contextual input devices to determine the value of one or more environmental parameters, which may be used to determine the current context. For example, where the television 580c is used as a contextual input device, data may be acquired from the television 580c to determine an operational state of the television 580c. In this case, where a value of an operational state environmental parameter is determined as ON, based on the acquired data, the current context may be determined as watching television. The user interface screen 1000H may provide a button 1034 used to initiate a device discovery process for determining devices which are capable of collecting data for determining a current context. The device discovery process may be similar to that described with respect to FIG. 10D. A list 1036 of the discovered devices may be displayed on the user interface screen 1000H. The computing device 501 may receive a selection through the user interface screen 1000H, such as via a button 1038, to enable one or more of the discovered devices as contextual input devices. Once enabled, a contextual input device may be disabled to discontinue use for determining a current context. The contextual input devices may be stored in the database 542 of the memory 540. After the user has completed determining the contextual input devices, the computing device 501 may return to the configuration menu on user interface screen 1000B.

Figure 9B:
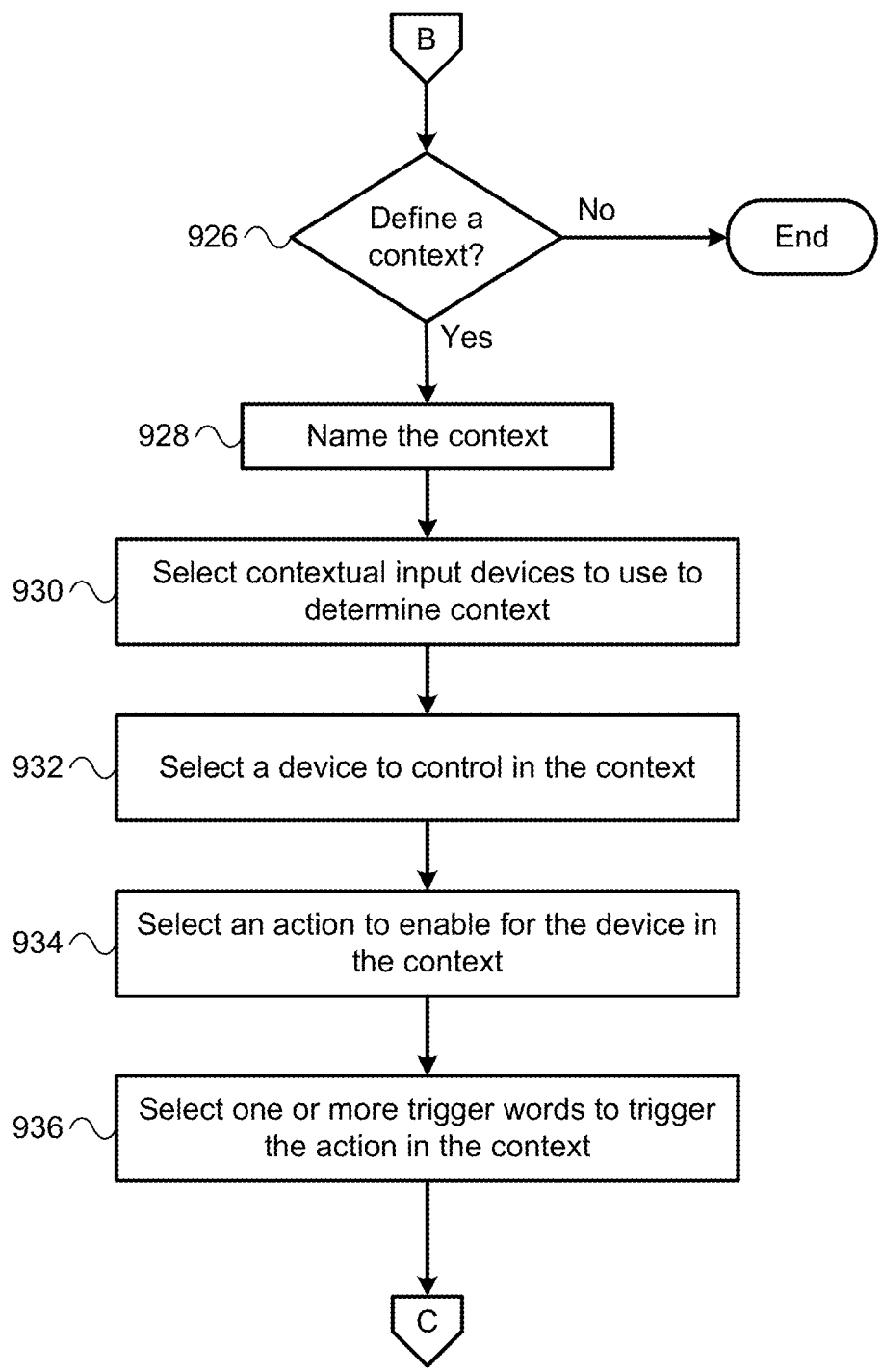

Referring to FIG. 9B, at step 926, the computing device 501 may determine whether a request to define a context for limiting trigger words is received via the configuration menu on the user interface screen 1000B. If a request to define a context is received, the method proceeds to step 928, otherwise the configuration process may end and the method may proceed to step 806 of FIG. 8.

At step 928, the user may provide input to the computing device 501 indicating a name of the context. For example, referring to FIG. 10I, a user interface screen 1000I may be displayed. The user may enter a context name 1040 via the user interface screen 1000I, which serves as a description of the context being defined, such as "Watching television," "At home," "In Vehicle," "No adults present," "At work," etc.

At step 930, the user may select, from a list 1042 of contextual input devices, those devices from which to collect data to determine the context being defined. The list 1042 may contain the contextual input devices that were enabled at step 924. The user may select one or more of the contextual input devices displayed in the list 1042. Additionally, the user may be provided with a user interface screen (not shown) for defining environmental parameters and corresponding values for each of the contextual input devices that may be used to determine (either alone or in combination with other information) that the necessary conditions are met for determining that the computing device 501 is in the context being defined. For example, if the context of watching television is being defined, and the television 580c (not shown) is selected as one of contextual input devices, the user may define an operational state environmental parameter for the television 580c with a corresponding value of "ON," thus, indicating that when the data acquired from the contextual input device, i.e., the television 580c, indicates that the television 580c is ON, the necessary conditions are met to determine the current context as watching television.

Multiple environmental parameters may be defined for each contextual input device to determine that the necessary conditions are met for determining the context being defined. For example, in addition to the operational state environmental parameter, a channel environmental parameter with a corresponding value of "18" may be defined to determine a channel which the television must be tuned into to determine that the current context is watching television. In this case, when the data acquired from the contextual input device, i.e., the television 580c, indicates that the television 580c is ON and is tuned into channel 18, the necessary conditions are met to determine the current context as watching television.

Multiple contextual input devices may be selected for use in determining the context being defined. For example, where the context of watching television is being defined, the television 580c may be selected as a contextual input device, as described above, and an additional contextual input device, such as a living room TV camera may be selected. Environmental parameters and corresponding values may be defined for determining that the necessary conditions, with regard to the camera, are met for determining, in conjunction with the television 580c, that the current context is watching television. For example, in addition to environmental parameters defined with respect to the television 580c, as described above, the user may also define a user presence detected environmental parameter for the camera with a corresponding value of "YES." In this case, when data acquired from the television 580c indicates that the television is ON and tuned to channel 18 and the data acquired from the camera indicates that a user's presence is detected by the camera, the necessary conditions are met to determine the current context as watching television.

Figure 10I:
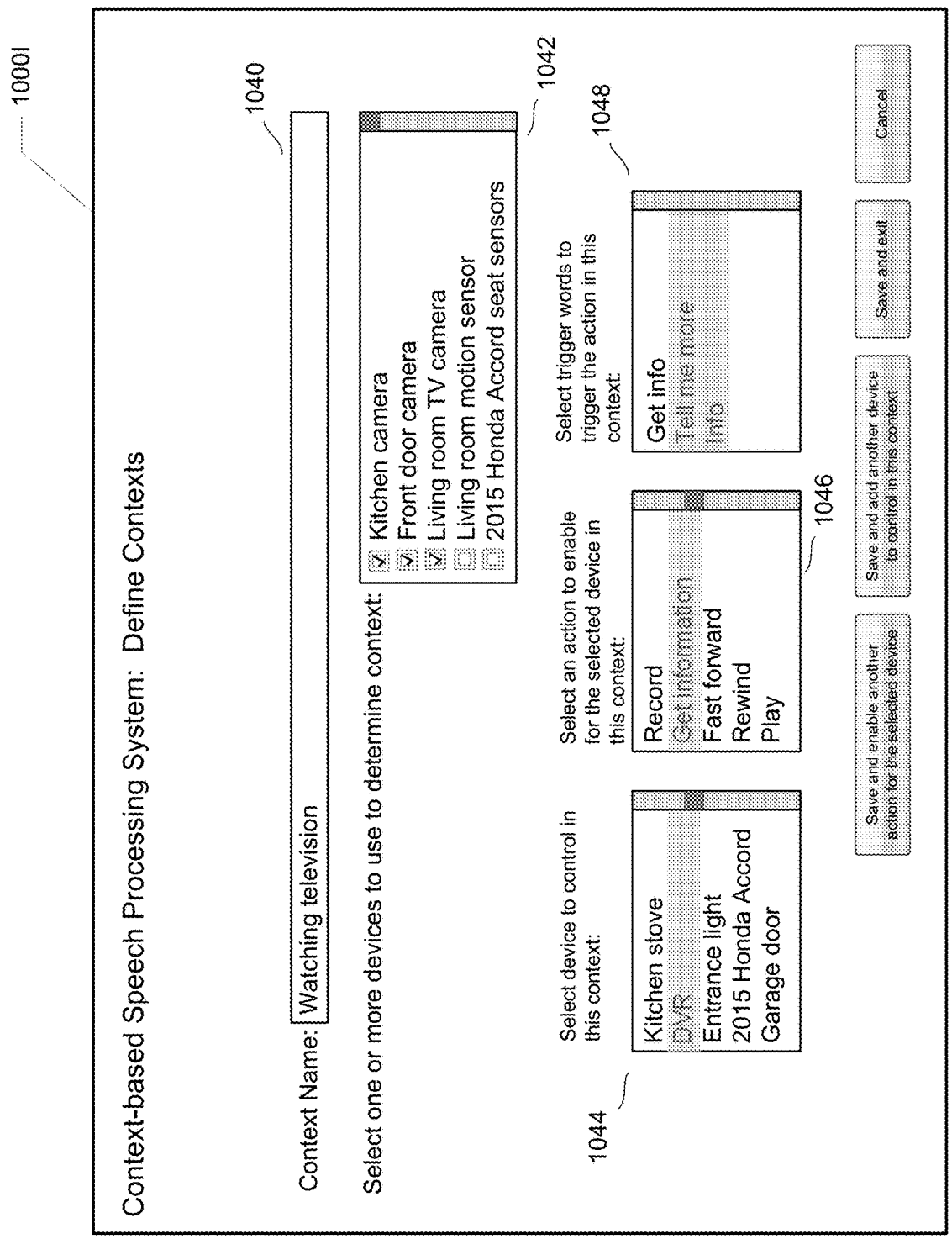
Figure 10J:
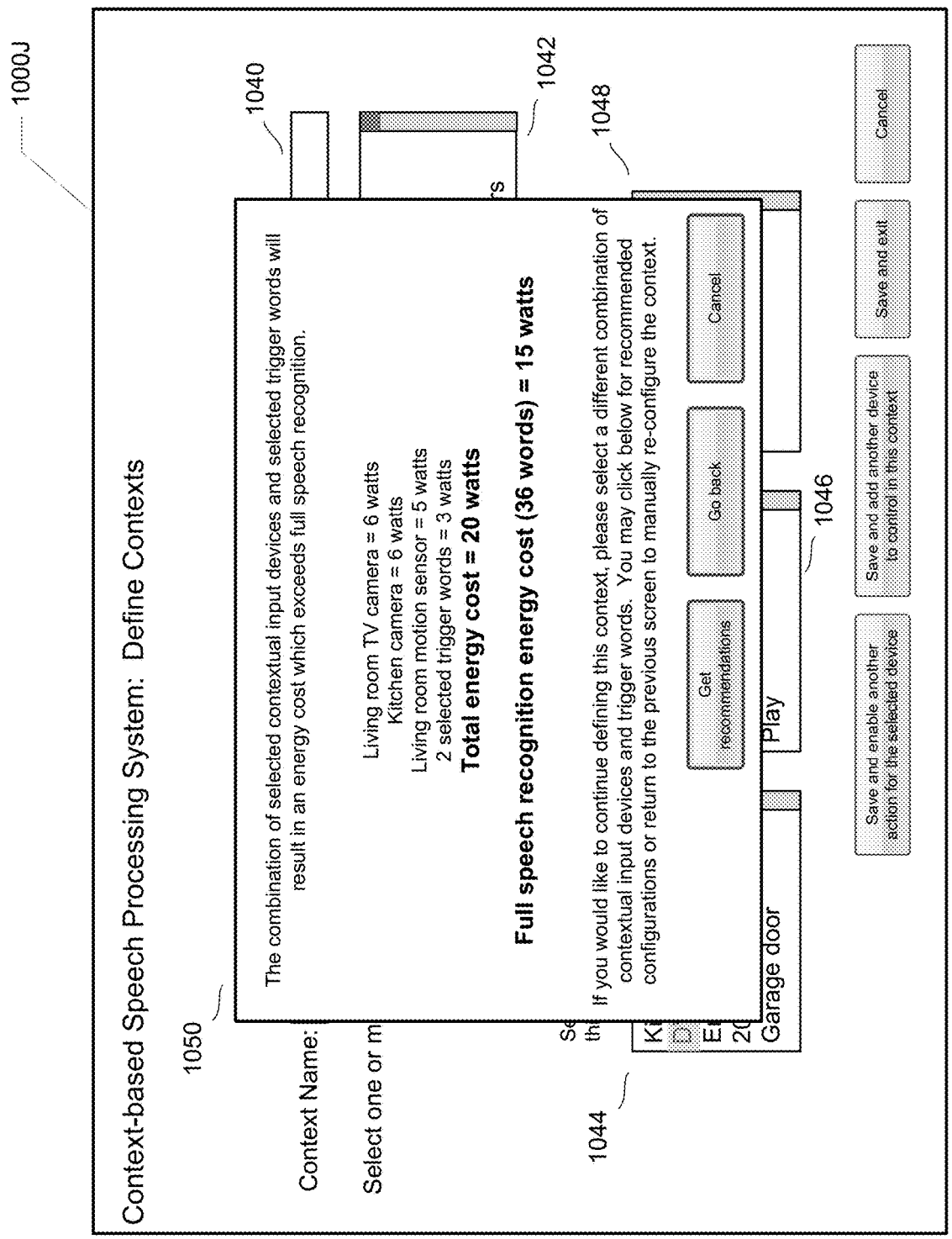

Referring back to FIG. 9B, at step 932, the user may select a device to control in the context being defined. For example, as shown in FIG. 10I, the user may select, from a list 1044 of controllable devices 580, those devices which the user would like the computing device 501 to control in the context being defined. The list 1044 may contain the controllable devices 580 that were registered at step 916.

Referring back to FIG. 9B, at step 934, the user may select an action to enable, for the controllable device 580 selected from the list 1044, in the context being defined. For example, as shown in FIG. 1000I, the user may select, from a list 1046 of actions, those actions which the user would like the computing device 501 to be able to control the selected controllable device 580 to perform in the context being defined. The list 1046 may contain the actions that were registered at step 918.

Referring back to FIG. 9B, at step 936, the user may select one or more trigger words that will trigger the action selected from the list 1046 to be performed in the context being defined, after being detected by the speech recognition module 537. For example, as shown in FIG. 1000I, the user may select, from a list 1048 of trigger words, those trigger words that the user would like the computing device 501 to recognize in the current context for controlling the controllable device 580, selected from the list 1044, to perform the action selected from the list 1046. The computing device 501 may, additionally, confirm that the selected trigger words do not conflict with any trigger words already defined for the context. That is, the computing device 501 may perform a check to confirm that the newly selected trigger words have not already been designated as trigger words for other actions enabled for the context being defined, such that it would be ambiguous which action the computing device 501 should perform after the trigger word is detected. When a conflict occurs, the computing device 501 may notify the user. The user may agree to accept the conflict, such as in an instance where the user intends to use a single trigger word to perform multiple actions at the same time, or the user may correct the conflict by changing a trigger word to avoid the conflict.

Figure 9C:
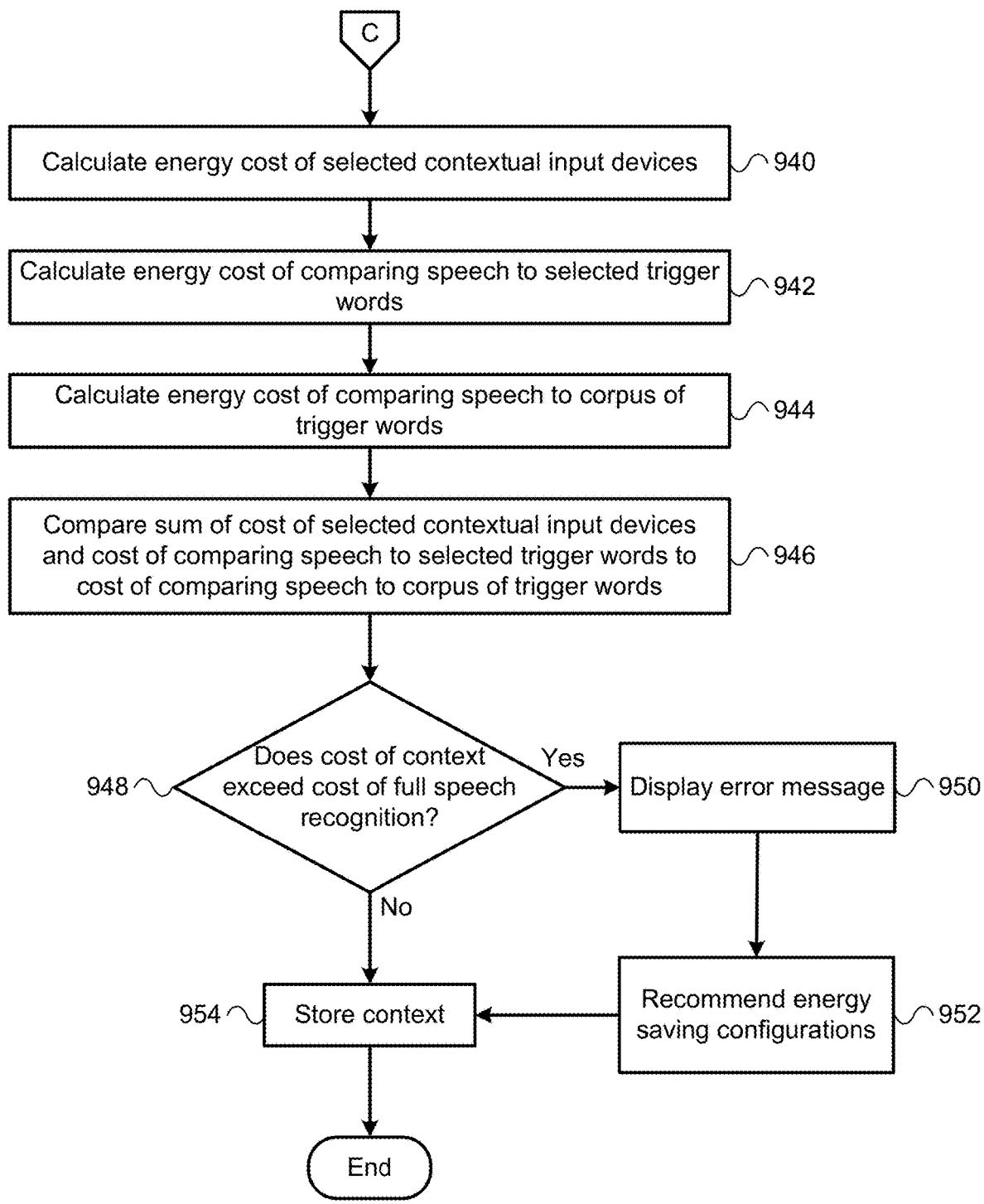

Referring to FIG. 9C, the computing device 501 may make an energy savings determination. That is, the computing device 501 may determine whether performing speech processing using the defined context to limit the trigger words recognized by the context-based speech processing system 500 results in an energy savings over simply performing speech processing without limiting the trigger words. At step 940, the computing device 501 may calculate the energy cost of operating the contextual input devices selected from the list 1042 in user interface screen 1000I in FIG. 10I. The computing device 501 may acquire, from the manufacturer of each of the contextual input devices, average energy usage for the device. This data may be downloaded automatically from an external data source, such as a database associated with the manufacturer, when the contextual input device is initially enabled in the context-based speech processing system 500 and stored in the memory 540. The computing device 501 may calculate the energy costs related to operating all of the contextual input devices to monitor for the current context.

At step 942, the computing device 501 may calculate the energy cost of performing context-based speech processing using the limited set of trigger words. That is, the computing device 501 may calculate the energy cost related to comparing, during context-based speech processing, detected speech to the limited set of trigger words selected from the list 1048 in user interface screen 1000I in FIG. 10I.

At step 944, the computing device 501 may calculate the energy cost of performing speech processing using the full corpus of trigger words. That is, the computing device 501 may calculate the energy cost related to comparing, during speech processing, detected speech to the full corpus of trigger words. This reflects the cost of operating the computing device 501 without context-based speech processing.

At step 946, the computing device 501 may sum the energy cost of operating the selected contextual input devices and the energy cost of performing context-based speech processing by comparing speech to the limited set of trigger words to determine the energy cost of operating the computing device 501 using the context-based speech processing. The computing device 501 may compare the energy cost of operating the computing device 501 using the context-based speech processing to the energy cost of operating the computing device 501 without the context-based speech processing.

At step 948, the computing device 501 may determine whether the cost of context-based speech processing using the limited set of trigger words exceeds the cost of performing the speech processing using the full corpus of trigger words. That is, if too many contextual input devices have been selected or if the contextual input devices selected use large amounts of energy to operate, the cost of operating those devices to monitor for the context, coupled with the cost of processing the limited set of trigger words, may actually be more expensive than simply operating the computing device 501 to perform speech processing using the full corpus of trigger words while ignoring the context. If the cost of context-based speech processing using the limited set of trigger words exceeds the cost of performing the speech processing using the full corpus of trigger words, the method proceeds to step 950, otherwise the method proceeds to step 954.

At step 950, an error message is displayed to notify the user that operating the computing device 501 to perform context-based speech processing using the context the user is attempting to define is more costly than operating the computing device 501 to perform speech processing using the full corpus of trigger words while ignoring the context. For example, referring to FIG. 10J, the error message 1050 may be displayed on the display device 560 of the computing device 501.

At step 952, the computing device 501 may provide the user with one or more recommendations (not shown) for defining the context, which will result in an energy savings. The recommendation may comprise adjusting the contextual input devices selected or the number of trigger words selected or some combination thereof. The recommendation may further comprise deleting or adjusting an already defined context that, perhaps, the computing device 501 has infrequently detected. The user may accept one of the recommendations to have the context settings automatically adjusted according to the selected recommendation or the user may return to the user interface screen 1000I to manually adjust the context. If the user accepts the recommendation and the necessary adjustments are made, the process may proceed to step 954.

At step 954, when the cost of operating the computing device 501 in the defined context does not exceed the cost of operating the computing device 501 to perform speech processing using the full corpus of trigger words, the context is stored. The context may be stored in the database 542 of the memory 540, such that the controllable devices 580, the actions to be controlled for the controllable device 580, and the corresponding trigger words for the actions are mapped to the context and the contextual input devices and their corresponding environmental parameters and values are additionally mapped to the context.

After the context is stored, the configuration process may be end and the method may return to step 806 of FIG. 8. Referring back to FIG. 8, at step 806, after the request to set the computing device 501 in listening mode is received, the method may proceed to step 808 to begin to listen for and process speech according to methods described herein.

Figure 9D:
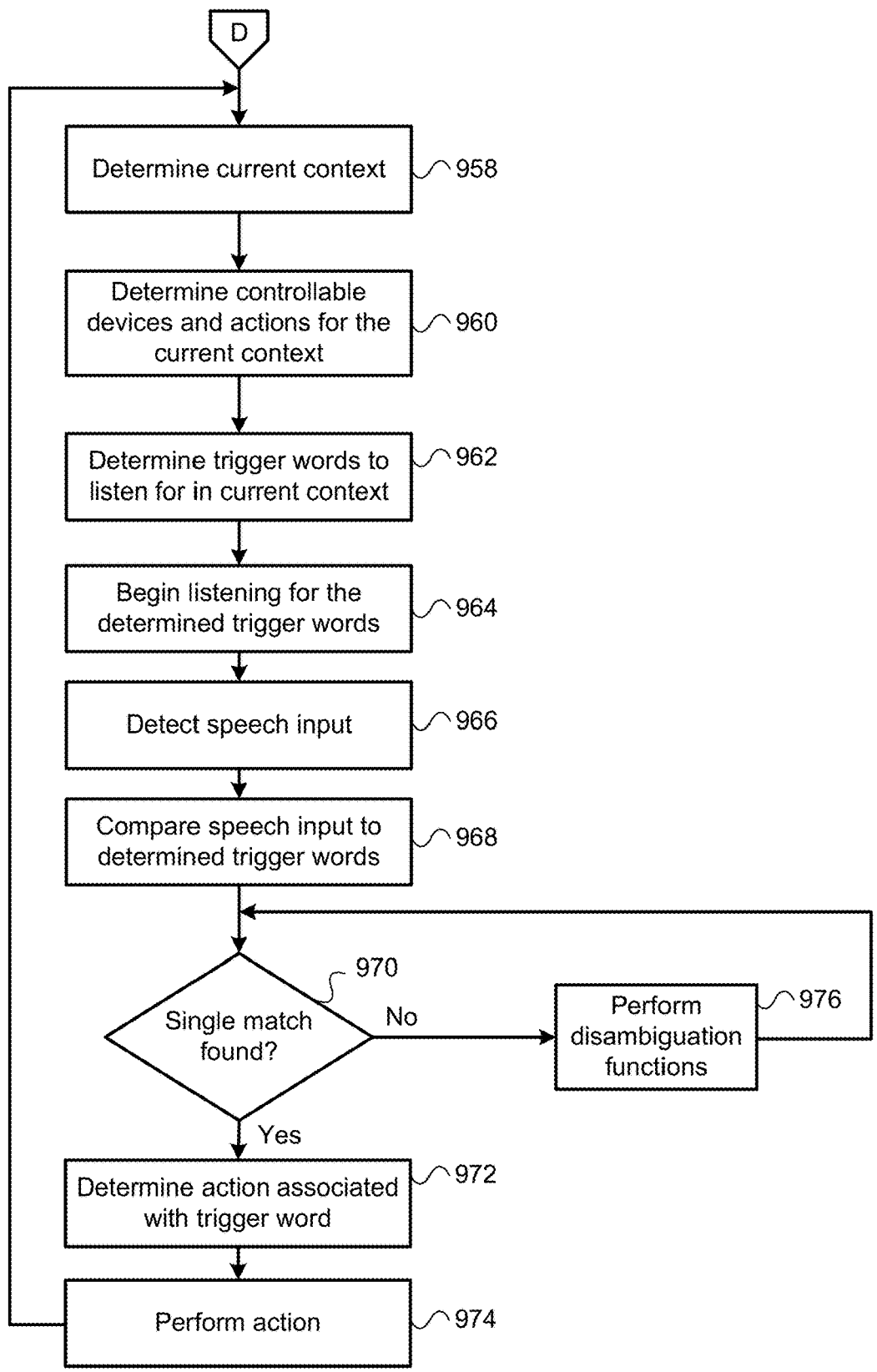

Referring to FIG. 9D, if the computing device 501 has been set to enter into listening mode, at step 958, the context determination module 531 of the computing device 501 may determine the current context by using the various contextual input devices selected during the configuration process, as set forth in steps 924 and 930 of FIGS. 9A and 9B, respectively, to monitor the environment and the corresponding environmental parameters and values to determine whether the necessary conditions have been meet for the given context. One or more contexts may be determined as the current context.

At step 960, the controllable device determination module 533 of the computing device 501 may determine one or more controllable devices 580 and/or actions which may be controlled in the determined context, such as those selected for the context during the configuration process, as set forth in steps 932 and 934 of FIG. 9B.

At step 962, the trigger word selection module 535 of the computing device 501 may determine the trigger words to listen for in the determined context or contexts based on the controllable devices 580 and the actions determined by the controllable device determination module 533. These may be the trigger words selected for the controllable device and action during the configuration process, such as those selected in step 936 of FIG. 9B.

At step 964, the computing device 501 may begin listening for speech input. In particular, the computing device 501 may listen for speech input comprising the trigger words determined in step 962.

At step 966, the speech recognition module may detect the speech input. The speech input may be detected via the one or more microphones $550_{1-n}$.

At step 968, the speech recognition module 537 of the computing device 501 may interpret the speech and compare the speech to only the trigger words determined in step 962. The computing device 501 may continue to listen for only the determined trigger words for as long as the current context is maintained.

At step 970, the speech recognition module 537 of the computing device 501 may determine whether a single match was found. If a single match was found, the method proceeds to step 972, otherwise the method proceeds to step 976 to again attempt to disambiguate the speech.

At step 972, if a single match was found, the action determination module 539 of the computing device 501 may determine one or more actions associated with the matched trigger word based on the actions and corresponding trigger words defined during the configuration process, as set forth in steps 934 and 936 of FIG. 9B.

At step 974, the computing device 501 may control to perform the determined one or more actions. After the one or more actions are performed, the method may return to step 958 to again determine the context.

At step 976, the disambiguation module 538 may perform one or more disambiguation functions to attempt to disambiguate the speech. After disambiguating the speech, the method may return to step 970 to determine if a single match may be found with the disambiguated speech. If not, the disambiguation module 538 may perform one or more additional disambiguation functions. The disambiguation module 538 may make a predefined number of attempts to disambiguate the speech before terminating the process.

The above-described features relate to a context-based speech processing system in which trigger words may dynamically change according to a determined context. Additionally, the context-based speech processing system 500 may be used to perform multi-factor authentication. For example, the computing device 501 together with other contextual input devices, such as a camera, a fingerprint reader, an iris scanner, a temperature sensor, a proximity sensor, other connected microphones, a mobile device being carried by the person speaking, etc., may be used to authenticate the speaker and trigger actions based on the identity of the speaker and a determined authorization level of the speaker. For example, after authenticating/identifying a speaker, an associated authorization level of the speaker may be determined. For example, for speakers known to the context-based speech processing system 500, such as registered users, the determined authorization level is that which was defined for the user during the configuration process. As previously noted, the authorization level may determine the level of control the speaker has over the computing device 501 and/or the various controllable devices 580. For example, in a household with a mother, a father, and a 10 year old son, the mother and father may have a high authorization level, while the son may have a medium authorization level. Unknown users, i.e., those who are unable to be authenticated and identified by the context-based speech processing system 500, such as guests, may default to a low authorization level. As previously noted, a high authorization level may allow the speaker unlimited control of the computing device 501 and/or the various controllable devices 580, while a medium authorization level may allow the speaker some, but not full, control of the computing device 501 and/or various controllable devices 580, and a low authorization level may allow the speaker only very limited, or even no, control of the computing device 501 and/or various controllable devices 580. The identity of the speaker and the speaker's associated authorization level may be but one factor in determining the current context. For example, if the mother is sitting in the vehicle 580a and speaks the command "turn on," the context-based speech processing system 500 may use a nearby camera to perform facial recognition, authenticate the speaker as the mother, and determine her authorization level as high. The context-based speech processing system 500 may further use a status of the vehicle seat sensor to detect that the mother is in the vehicle 580a. As a result, the current context may be determined as mother in the vehicle. Because the mother has a high authorization level, the context-based speech processing system 500 may trigger the system to perform the action of turning the car on. However, in the same scenario, if the 10 year old son speaks the "turn on" command, the system may perform the same authentication step, determine that the speaker is the 10 year old son with a medium authorization level, determine based on the seat sensor that the son is in the vehicle 580a, and may determine the context as son in the vehicle. The context-based speech processing system 500 may not perform the action of turning on the vehicle 580a, because with a medium authorization level the son may not have the appropriate level of authority to trigger such an action.

Alternatively, the same command "turn on" may have a different meaning in the same context dependent on the authorization level of the speaker. For example, for the son with the medium authorization level, "turn on" may instead trigger the radio of the vehicle to be turned on. Further, a speaker determined to have a low authorization level may not be able to control the context-based speech processing system 500 to perform any actions in response to the speaker speaking the words "turn on" in the same context. The various actions which may be controlled based on the authorization level may be defined during the configuration process and may be stored in the memory 540.

The context-based speech processing system 500 may control a threat level of the computing device 501 based on a location of the device For example, if the computing device 501 is located in an area that is typically considered a private or secure area, such as a locked bedroom, the threat level of the computing device 501 may be set to low, so that a speaker need not be authenticated in order to control the computing device 501 and/or the controllable devices 580. Contrarily, if the computing device 501 is located in a public or unsecure area, such as a restaurant, the threat level of the computing device 501 may be set to high, requiring authentication of any speaker to the computing device 501 in order to control the computing device 501 or the controllable devices 580. The various locations and corresponding threat levels may be defined during the configuration process and may be stored in the memory 540. The location of the computing device 501 may be determined using data acquired from the contextual input devices as described above.

The context-based speech processing system 500 may not require the use of speech and, instead, may be operated solely based on the current context. For example, in response to biometric data being collected from a wearable device, such as a heartrate monitor, detecting that a user of the device has an elevated heart rate, the context-based speech processing system 500 may determine the context as the user in distress, and the context alone may trigger the system to perform an action, in the absence of any trigger word, such as contact emergency services.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

What is claimed is:
1. A method comprising:
   storing, by a computing device, information associated with a plurality of different environmental contexts, wherein for each of the different environmental contexts, the information indicates:
      one or more content output types associated with that environmental context; and
      an associated set of trigger commands that the computing device is configured to detect in that environmental context, wherein the set of trigger commands comprises fewer than a quantity of trigger commands in a group of trigger commands associated with the computing device;
   determining, based on content being output in an environment associated with the computing device and on the information, a first set of trigger commands associated with a current environmental context; and
   determining, based on the first set of trigger commands and after detecting a speech input, whether the speech input comprises a trigger command of the first set of trigger commands.

2. The method of claim 1, further comprising:
   determining, based on output of a video program, the current environmental context.

3. The method of claim 1, wherein for each of the different environmental contexts, the information further indicates one or more devices capable of being controlled in that environmental context.

4. The method of claim 1, further comprising:
   determining, based on data from one or more sensors, the environment associated with the computing device; and
   outputting, based on a difference between energy usage of the computing device associated with listening for the first set of trigger commands and energy usage of the computing device associated with listening for the group of trigger commands, a recommendation for adjusting at least one of:
   the one or more sensors, or
   the first set of trigger commands.

5. The method of claim 1, wherein for each of the different environmental contexts, the information further indicates one or more actions that the computing device is configured to perform based on detection of a trigger command of the first set of trigger commands associated with that environmental context.

6. The method of claim 1, further comprising:
   receiving second information associated with a second environmental context, wherein the second information comprises a second set of trigger commands that the computing device is configured to detect in the second environmental context,
   wherein a first trigger command, of the first set of trigger commands, for triggering performance of a first action in the current environmental context is different from a second trigger command, of the second set of trigger commands, for triggering performance of the first action in the second environmental context.

7. The method of claim 1, wherein the information further indicates one or more sensors used to recognize that environmental context, and
   wherein storing the information is based on an energy cost associated with operating the one or more sensors.

8. The method of claim 1, further comprising:
   outputting, prior to storing the information and based on determining that using a first environmental context, of the plurality of different environmental contexts, does not yield a threshold energy savings, an error message; and
   receiving updated information associated with the first environmental context,
   wherein the storing the information is based on determining, based on the updated information, that an energy cost associated with the first environmental context yields the threshold energy savings.

9. The method of claim 1, the method further comprising:
   determining the current environmental context based on content being output by a television.

10. The method of claim 1, the method further comprising:
    determining the current environmental context based on audio content being output by an alarm clock or a doorbell.

11. A method comprising:
- determining, by a computing device and based on content being output in an environment associated with the computing device, a current environmental context;
- determining one or more devices capable of being controlled in the current environmental context;
- determining, based on the determined one or more devices, a set of trigger commands associated with speech recognition and the current environmental context, wherein the set of trigger commands comprises fewer than a quantity of trigger commands in a group of trigger commands associated with the computing device; and
- listening, while performing the speech recognition on a speech input, for the set of trigger commands.

12. The method of claim 11, wherein determining the current environmental context comprises determining the current environmental context further based on data acquired from one or more sensors.

13. The method of claim 11, wherein determining the current environmental context comprises determining the current environmental context further based on receiving data from one or more indoor positioning devices indicating an indoor location of the computing device and based on determining a distance of the computing device from a controllable device.

14. The method of claim 11, wherein determining the current environmental context is further based on receiving data from one or more input devices indicating detection of an individual, different from a user providing the speech input, in proximity to the computing device.

15. The method of claim 11, further comprising:
- determining, based on a changed environmental context different from the current environmental context, a second set of trigger commands different from the set of trigger commands.

16. The method of claim 11, further comprising:
- determining, for a device of the one or more devices, one or more actions performable in the first environmental context; and
- determining one or more trigger commands, of the full set of trigger commands, associated with the one or more actions in the first environmental context.

17. The method of claim 11, further comprising:
- determining a difference between energy usage associated with listening for the set of trigger commands and energy usage associated with listening for the group of trigger commands; and
- based on a determination that the difference satisfies a predetermined threshold, commencing listening for the group of trigger commands.

18. A method comprising:
- determining, by a computing device, a group of trigger commands that are recognizable based on speech recognition;
- determining, based on sensor data indicating content being output in an environment associated with the computing device, a first environmental context;
- determining, based on the first environmental context, a first set of trigger commands from the group of trigger commands, wherein the first set of trigger commands comprises fewer than a quantity of trigger commands in the group of trigger commands; and determining, based on comparing a first speech input to the first set of trigger commands, whether the first speech input comprises a trigger command of the first set of trigger commands.

19. The method of claim 18, further comprising:
- determining, based on a second environmental context different from the first environmental context, a second set of trigger commands from the group of trigger commands, wherein the second set of trigger commands is different from the first set of trigger commands; and
- determining, based on comparing a second speech input to the second set of trigger commands, whether the second speech input comprises a trigger command of the second set of trigger commands.

20. The method of claim 18, further comprising:
- controlling, based on determining that the first speech input comprises the trigger command, a first device; and
- controlling, in a second environmental context and based on determining that a second speech input comprises the trigger command, a second device different from the first device.

* * * * *

UNITED STATES PATENT AND TRADEMARK OFFICE
CERTIFICATE OF CORRECTION

| | |
|---|---|
| PATENT NO. | : 11,100,925 B2 |
| APPLICATION NO. | : 16/212305 |
| DATED | : August 24, 2021 |
| INVENTOR(S) | : Michael Chen |

It is certified that error appears in the above-identified patent and that said Letters Patent is hereby corrected as shown below:

In the Specification

Detailed Description, Column 5, Line 14:
Please delete "119." and insert --118.--

Detailed Description, Column 5, Line 14:
Delete "119" and insert --118--

Detailed Description, Column 5, Line 25:
Delete "119" and insert --118--

Detailed Description, Column 9, Line 27:
Delete "movable" and insert --removable--

Detailed Description, Column 15, Line 49:
Delete "380a," and insert --580$a$,--

Detailed Description, Column 16, Line 66:
Delete "508a," and insert --580$a$,--

Detailed Description, Column 20, Line 9:
Delete "119," and insert --118,--

Detailed Description, Column 22, Line 5:
Delete "537" and insert --538--

Signed and Sealed this
Twenty-fifth Day of April, 2023

*Katherine Kelly Vidal*

Katherine Kelly Vidal
*Director of the United States Patent and Trademark Office*